United States Patent
Qi et al.

(10) Patent No.: US 11,109,191 B2
(45) Date of Patent: Aug. 31, 2021

(54) METHOD FOR DISPLAYING CURRENT GEOGRAPHICAL LOCATION ON EMERGENCY CALL SCREEN AND TERMINAL

(71) Applicant: HUAWEI TECHNOLOGIES CO., LTD., Guangdong (CN)

(72) Inventors: Ning Qi, Beijing (CN); Shiyong Cao, Beijing (CN)

(73) Assignee: Huawei Technologies Co., Ltd., Guangdong (CN)

(*) Notice: Subject to any disclaimer, the term of this patent is extended or adjusted under 35 U.S.C. 154(b) by 0 days.

(21) Appl. No.: 16/336,811

(22) PCT Filed: Nov. 3, 2016

(86) PCT No.: PCT/CN2016/104405
§ 371 (c)(1),
(2) Date: Mar. 26, 2019

(87) PCT Pub. No.: WO2018/058738
PCT Pub. Date: Apr. 5, 2018

(65) Prior Publication Data
US 2019/0230476 A1    Jul. 25, 2019

(30) Foreign Application Priority Data
Sep. 27, 2016  (CN) .......................... 201610856778.1

(51) Int. Cl.
*H04W 4/029* (2018.01)
*H04W 4/90* (2018.01)
(Continued)

(52) U.S. Cl.
CPC ............ *H04W 4/029* (2018.02); *G06F 3/048* (2013.01); *H04L 67/18* (2013.01);
(Continued)

(58) Field of Classification Search
CPC ....... H04W 4/90; H04W 4/021; H04W 4/029; H04W 76/50; H04W 4/046; H04W 4/027;
(Continued)

(56) References Cited

U.S. PATENT DOCUMENTS 6,225,944 B1 * 5/2001 Hayes .................. G01S 5/0027
342/357.4
6,456,852 B2    9/2002 Bar et al.
(Continued)

FOREIGN PATENT DOCUMENTS

CN          101111087 A       1/2008
CN          101335958 A      12/2008
(Continued)

OTHER PUBLICATIONS

PCT International Search Report and Written Opinion in International Application No. PCT/CN2016/104405, dated Apr. 20, 2017, 17 pages (With English translation).
(Continued)

*Primary Examiner* — Nimesh Patel
(74) *Attorney, Agent, or Firm* — Fish & Richardson P.C.

(57) ABSTRACT

The present disclosure relates to current geographical location displaying methods and devices. One example method includes detecting whether a user initiates an emergency call, in response to detecting that the user initiates an emergency call, obtaining current geographical location information, and presenting the current geographical location information on an emergency call screen. A presentation form comprises at least one of a text form and a map form.

16 Claims, 20 Drawing Sheets

(51) Int. Cl.
| | |
|---|---|
| *H04W 4/02* | (2018.01) |
| *G06F 3/048* | (2013.01) |
| *H04L 29/08* | (2006.01) |
| *H04W 88/02* | (2009.01) |
| *H04M 1/72418* | (2021.01) |
| *G06F 3/0485* | (2013.01) |
| *H04W 76/50* | (2018.01) |
| *G06Q 50/26* | (2012.01) |
| *G06F 3/0481* | (2013.01) |
| *H04W 4/30* | (2018.01) |

(52) U.S. Cl.
CPC ......... H04M 1/72418 (2021.01); H04W 4/02 (2013.01); H04W 4/90 (2018.02); H04W 88/02 (2013.01); *G06F 3/0481* (2013.01); *G06F 3/0485* (2013.01); *G06Q 50/265* (2013.01); *H04M 2242/04* (2013.01); *H04M 2242/30* (2013.01); *H04W 4/30* (2018.02); *H04W 76/50* (2018.02)

(58) Field of Classification Search
CPC ..... H04W 4/023; H04W 4/025; H04W 4/024; H04W 4/33; H04W 4/02; H04W 88/02; H04W 4/04; H04W 4/06; H04W 4/026; H04W 60/04; H04W 72/1247; H04W 8/186; H04W 8/18; H04W 8/24; H04W 48/04; H04W 48/16; H04W 84/042; H04W 64/00; H04M 2250/10; H04M 2250/02; H04M 1/0266; H04M 1/575; H04M 1/6091; H04M 1/72569; H04M 1/7253; H04M 2242/15; H04M 3/42229; H04M 3/42348; H04M 2203/655; H04M 7/0024; H04M 1/72572; H04M 2250/12; H04M 1/274566; H04M 1/72563; G08G 1/166; G08G 1/205; G08G 1/162; G08G 1/20; G08G 5/045; G08G 1/093; G06Q 50/265; G06Q 50/01; G06Q 10/063114; G06Q 30/0261; G06Q 50/26; H04L 67/18; H04L 12/66; H04L 51/10; H04L 51/20; H04L 51/38; H04L 67/02; H04L 29/06; H04L 63/123; H04L 29/12169; H04L 61/1576; H04L 67/16; H04L 41/08; H04L 63/102; H04L 67/125; H04L 69/08; H04L 67/24; H04L 67/306; H04L 67/34; G06F 16/29; G06F 17/00; G06F 3/048; G06F 3/1423; G06F 16/9537; G06F 17/2223; G06F 2221/2111; G06F 2221/2113; G06F 2221/2149; G06F 17/275; G06F 21/6227; G06F 3/0482; G06F 9/454; G08B 25/016; G08B 27/006; G08B 7/066; G08B 21/0269; G08B 27/001; G08B 21/02; G08B 21/0202; G08B 21/0294; G08B 21/0446; G08B 21/22; G08B 25/08; G08B 5/40; G08B 25/10; G08B 13/19652; G08B 15/004; G08B 21/182; G08B 25/00; G06K 9/00006; G06K 9/00013; G06K 9/00228; G06K 9/00892; G06K 9/6267; G06T 7/00; G06T 2207/10016; G06T 2207/30168; G06T 7/0002; G06T 7/41; G01S 13/74; G01S 13/878; G01S 19/28; G01S 19/40; G01S 19/42; G01S 5/0205; G01S 5/14; G01S 5/30; G01S 19/48; G01S 1/68; G01S 5/02

See application file for complete search history.

(56) References Cited

U.S. PATENT DOCUMENTS

| | | | |
|---|---|---|---|
| 7,558,584 | B2 | 7/2009 | Yamamoto et al. |
| 2001/0051514 | A1* | 12/2001 | Lindholm ....... H04M 1/274566 455/404.2 |
| 2006/0212591 | A1 | 9/2006 | Oberle et al. |
| 2007/0040895 | A1* | 2/2007 | Barbeau .......... G08B 13/19658 348/14.01 |
| 2007/0049287 | A1* | 3/2007 | Dunn ................ H04M 1/72536 455/456.1 |
| 2008/0284587 | A1* | 11/2008 | Saigh ................ H04M 1/72541 340/539.13 |
| 2010/0272057 | A1* | 10/2010 | Chen ...................... H04L 41/08 370/329 |
| 2012/0295579 | A1* | 11/2012 | Miyano ............... H04L 12/6418 455/404.2 |
| 2014/0221016 | A1 | 8/2014 | Lee et al. |
| 2014/0287711 | A1* | 9/2014 | Williams .......... H04M 1/72538 455/404.1 |
| 2015/0004926 | A1 | 1/2015 | Alhazme |
| 2015/0156321 | A1* | 6/2015 | Abnett ................ G06F 16/2455 379/45 |
| 2015/0201055 | A1* | 7/2015 | Li ................... H04M 1/274566 379/218.01 |
| 2016/0125727 | A1 | 5/2016 | Yeh |
| 2017/0223620 | A1* | 8/2017 | Liu ....................... H04W 48/14 |
| 2019/0124192 | A1* | 4/2019 | Zhao ............... H04M 1/274566 |

FOREIGN PATENT DOCUMENTS

| | | |
|---|---|---|
| CN | 101873395 A | 10/2010 |
| CN | 102045637 A | 5/2011 |
| CN | 102098618 A | 6/2011 |
| CN | 102318375 A | 1/2012 |
| CN | 103037309 A | 4/2013 |
| CN | 103095935 A | 5/2013 |
| CN | 103297610 A | 9/2013 |
| CN | 103888594 A | 6/2014 |
| CN | 103945354 A | 7/2014 |
| CN | 104219625 A | 12/2014 |
| CN | 105407223 A | 3/2016 |
| CN | 105472109 A | 4/2016 |
| WO | 2013174330 A2 | 11/2013 |

OTHER PUBLICATIONS

Partial Supplementary European Search Report issued in European Application No. 16917485.1 dated Jul. 9, 2019, 20 pages.
Extended European Search Report issued in European Application No. 16917485.1 dated Oct. 9, 2019, 17 pages.
Office Action issued in Chinese Application No. 201680086704.2 dated Nov. 4, 2019, 16 pages (with English translation).
Office Action issued in Australian Application No. 2016424950 dated Aug. 13, 2020, 5 pages.
Office Action issued in Chinese Application No. 201680086704.2 dated Feb. 3, 2021, 16 pages (with English translation).
Office Action issued in Chinese Application No. 201680086704.2 dated Jun. 2, 2021, 7 pages.
EPO Communication pursuant to Article 94(3) EPC issued in European Application No. 16917485.1 dated Jul. 6, 2021, 6 pages.

* cited by examiner

METHOD FOR DISPLAYING CURRENT GEOGRAPHICAL LOCATION ON EMERGENCY CALL SCREEN AND TERMINAL

CROSS-REFERENCE TO RELATED APPLICATIONS

This application is a National Stage of International Application No. PCT/CN2016/104405 filed Nov. 3, 2016, which claims priority to Chinese Patent Application No. 201610856778.1, filed on Sep. 27, 2016 and entitled "METHOD FOR DISPLAYING CURRENT GEOGRAPHICAL LOCATION ON EMERGENCY CALL SCREEN AND MOBILE TERMINAL", which is hereby incorporated by reference in its entirety.

TECHNICAL FIELD

Embodiments of the present invention relate to the communications field, and in particular, to a method for displaying a current geographical location on an emergency call screen and a terminal.

BACKGROUND

In case of emergency such as a traffic accident, a danger, a medical emergency, or another unexpected case, a user needs to make an emergency call to seek for rescue. In the prior art, to improve a survival probability of the user, an emergency call can be made without unlocking a terminal.

However, in actual application, a rescue success rate is affected due to factors such as a long rescue time and a search difficulty.

SUMMARY

Embodiments of the present invention provide a method for displaying a current geographical location on an emergency call screen and a terminal, to display current geographical location information on the emergency call screen, so that after an emergency call is answered, a user can inform, based on the current geographical location information, a called party of the current geographical location information displayed on the emergency call screen. In this way, the called party can provide a rescue service more properly and in a more timely manner, thereby improving a rescue success rate.

According to a first aspect, an embodiment of the present invention provides a method for displaying a current geographical location on an emergency call screen. The method includes: detecting whether a user initiates an emergency call; if the user initiates an emergency call, obtaining current geographical location information; and presenting the current geographical location information on the emergency call screen, where a presentation form includes at least one of the following: a text form and a map form. In this embodiment of the present invention, the current geographical location information can be displayed on the emergency call screen, so that after the emergency call is answered, the user can inform a rescuer of the current geographical location information displayed on the emergency call screen. In this way, the rescuer can provide a rescue service more properly and in a more timely manner, thereby improving a rescue success rate.

In a possible implementation, the current geographical location information may be obtained at a specified cycle, and may be dynamically refreshed in real time in an emergency dial pad based on a geographical location.

In another possible implementation, the obtaining current geographical location information includes: determining a version of a terminal; selecting an obtaining manner of the current geographical location information based on the version of the terminal; and obtaining the current geographical location information in the obtaining manner of the geographical location information. In this embodiment of the present invention, a more proper obtaining manner of geographical location information may be selected based on versions of different terminals, so that the geographical location information is obtained more accurately and an obtaining success rate is high.

In still another possible implementation, the presenting the current geographical location information on the emergency call screen includes: displaying a thumbnail view on the emergency call screen, where the thumbnail view includes the current geographical location information.

In still another possible implementation, the method further includes: receiving a first user operation, where the first user operation is used to instruct the terminal to display a detailed view; and displaying the detailed view on the emergency call screen.

In still another possible implementation, the method further includes: receiving a second user operation, where the second user operation includes a destination address; and enabling, based on the second user operation, a service to navigate from the current geographical location to the destination address.

In still another possible implementation, when the presentation form includes the text form, the method further includes:

receiving a third user operation, where the third operation is used to instruct to display the current geographical location information in the map form on the emergency call screen; and displaying the current geographical location information in the map form on the emergency call screen.

According to a second aspect, an embodiment of the present invention provides an apparatus configured to display a current geographical location on an emergency call screen. The apparatus includes: a detection unit, configured to detect whether a user initiates an emergency call; an obtaining unit, configured to: if the user initiates an emergency call, obtain current geographical location information; and a display unit, configured to present the current geographical location information on the emergency call screen, where a presentation form includes at least one of the following: a text form and a map form.

In an optional implementation, the obtaining unit is further configured to obtain the current geographical location information at a specified cycle.

In another optional implementation, the obtaining unit is further configured to determine a version of a terminal; select an obtaining manner of the current geographical location information based on the version of the terminal; and obtain the current geographical location information in the obtaining manner of the geographical location information.

In still another optional implementation, the display unit is further configured to display a thumbnail view on the emergency call screen, where the thumbnail view includes the current geographical location information.

In still another optional implementation, a first user operation is received, where the first user operation is used to instruct the terminal to display a detailed view.

In still another optional implementation, the apparatus further includes a receiving unit, configured to receive a first user operation, where the first user operation is used to instruct the terminal to display a detailed view.

In yet another optional implementation, the apparatus further includes the receiving unit, configured to receive a second user operation, where the second user operation includes a destination address The apparatus further includes a navigation unit, configured to enable, based on the second user operation, a service to navigate from the current geographical location to the destination address.

In yet another optional implementation, the receiving unit is further configured to receive a third user operation, where the third operation is used to instruct to display the current geographical location information in the map form on the emergency call screen.

According to a third aspect, an embodiment of the present invention provides a terminal. The terminal can implement the steps performed by the terminal in the method in the first aspect and the optional implementations. The terminal may be implemented by hardware, or may be implemented by hardware by executing corresponding software. The hardware or the software includes one or more modules corresponding to the foregoing functions.

According to a fourth aspect, an embodiment of the present invention provides a computer storage medium, configured to store a computer software instruction used by the foregoing terminal, where the computer storage medium includes a program designed to perform the first aspect and the optional implementations.

DESCRIPTION OF EMBODIMENTS

Figure 1:
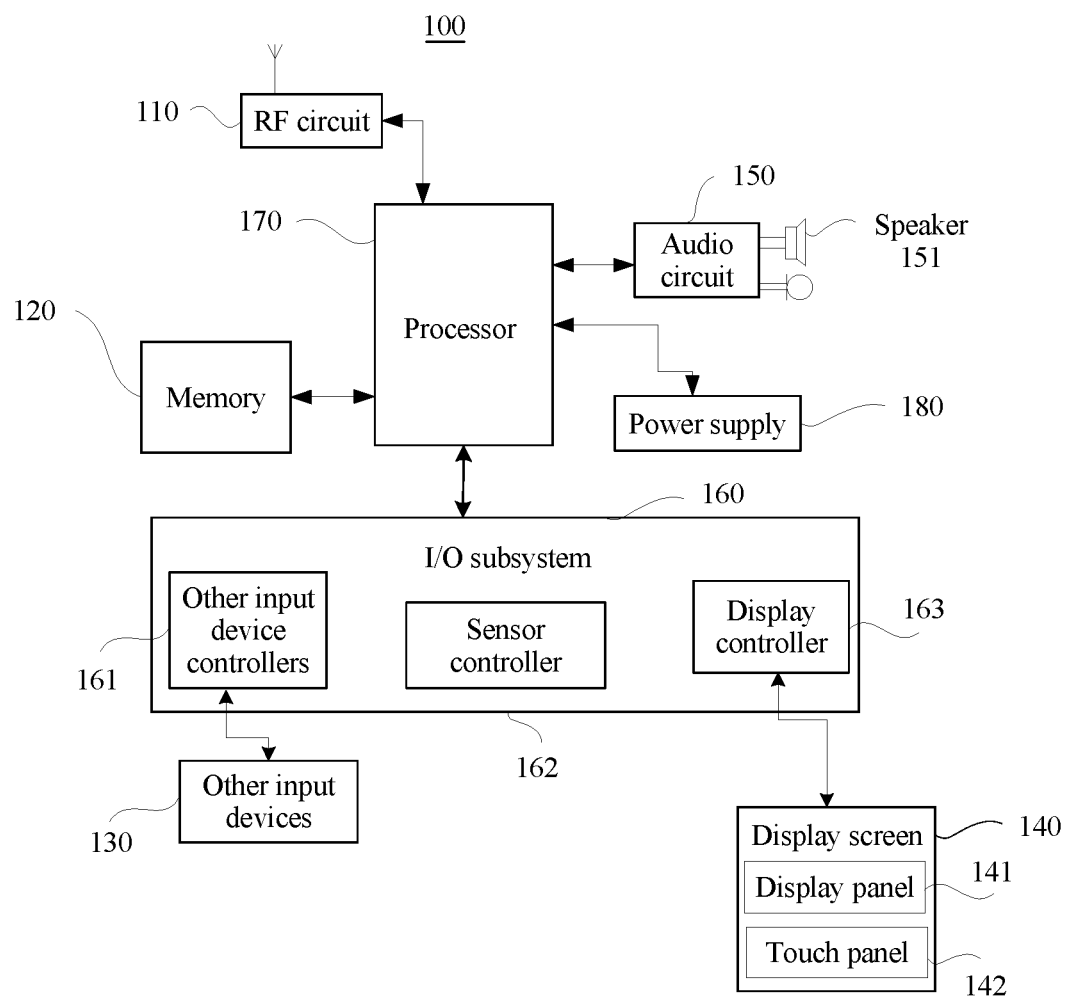
FIG. 1 is a schematic structural diagram of a terminal according to an embodiment of the present invention.

Embodiments of the present invention relate to a communication method for an emergency call, and a terminal. In the embodiments of the present invention, when an emergency call is made by using the terminal, current geographical location information can be displayed on an emergency call screen. The geographical location information may be displayed in a text form, a map form, or a combination thereof. A called party of the emergency call can be informed, in a timely manner, of the location information displayed on the terminal of a user, to provide an emergency service more rapidly and properly.

It should be noted that in the embodiments of the present invention, the "emergency call screen" is a screen on which the terminal provides an emergency call service to interact with the user, and may also be referred to as an emergency call screen. The emergency call service includes but is not limited to a call service, a short message service, a positioning service, a navigation service, and the like. The emergency call screen includes but is not limited to an interface that displays an emergency call dial pad, an interface that displays an emergency call status, a navigation interface, and the like.

The current geographical location information in the text form means that a current geographical location is described by using text. The current geographical location information may be latitude and longitude information of the current location, a communication address of the current location, or other information that can identify a location, for example, No. xx, xx Road, xx City. Some geographical locations without specific communication addresses may be described by using a relatively well-known or closest communication address, for example, a specific direction (for example, 200 meters southwest) of No. xx, xx Road, xx City, or 200 meters southwest of xx Public Security Bureau, xx District, xx City.

The current geographical location information in the map form means an electronic map in which a current geographical location is indicated by using a mark such as a specific point or icon. In the embodiments of the present invention, the current geographical location information in the map form may include a thumbnail view and a detailed view. The detailed view and the thumbnail view are relative concepts. The thumbnail view summarizes the detailed view. The detailed view is displayed on a larger area than the thumbnail view on the terminal. Richer content may be viewed by controlling a scale for displaying the detailed view on the terminal. For example, when same scales are used for controlling the detailed view and the thumbnail view, the detailed view displayed on the terminal can describe a larger range of peripheral information of the current geographical location. When a larger scale is used for the detailed view than the thumbnail view, the detailed view displayed on the terminal can describe more details about the current geographical location. When a smaller scale is used for the detailed view than the thumbnail view, the detailed view displayed on the terminal can describe the current geographical location more broadly.

The terminal in the embodiments of the present invention may include a mobile phone, a tablet computer, a personal digital assistant (Personal Digital Assistant, PDA), a point of sale (Point of Sales, POS) terminal, an in-vehicle computer, and the like.

The following further describes a structure of the terminal by using a terminal in FIG. 1 as an example. FIG. 1 is a block diagram of a partial structure of a terminal 100 related to an embodiment of the present invention. Referring to FIG. 1, the terminal 100 includes components such as a radio frequency (Radio Frequency, RF) circuit 110, a memory 120, other input devices 130, a display screen 140, an audio circuit 150, an I/O subsystem 160, a processor 170, and a power supply 180. A person skilled in the art can understand that the structure of the mobile phone shown in FIG. 1 constitutes no limitation on the mobile phone, and the terminal may include more or fewer components than those shown in the figure, or combine some components, or split some components, or have different component arrangements. A person skilled in the part can understand that the display screen 140 is a user interface (User Interface, UI), and the terminal 100 may include more or fewer user interfaces than those shown in the figure.

The following describes in detail the components of the terminal 100 with reference to FIG. 1.

The RF circuit 110 may be configured to receive and send a radio signal in an emergency call procedure, and may be further configured to receive and send information, a call, or the like. In particular, the RF circuit 110 is configured to: send, to a base station, uplink data used for an emergency call; or receive downlink data sent by a base station and transmit the downlink data to the processor 170 for processing. The RF circuit usually includes but is not limited to an antenna, at least one amplifier, a transceiver, a coupler, a low noise amplifier (Low Noise Amplifier, LNA), a duplexer, and the like. In addition, the RF circuit 110 may further communicate with a network and other devices through wireless communication. The wireless communication may use any communication standard or protocol, including but not limited to a Global System for Mobile Communications (Global System of Mobile communication, GSM), a General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an e-mail, a short message service (Short Messaging Service, SMS), and the like.

The memory 120 may be configured to store a software program. The processor 170 performs various functions of the terminal 100 by running the software program stored in the memory 120. The memory 120 may mainly include a program storage area and a data storage area. The program storage area may store an operating system, an application program required by at least one function, and the like. The at least one function may include one or more of a sound playing function, an image and text displaying function, a positioning function, a navigation function, or the like. The data storage area may store data (such as audio data, an image, or a phonebook) that is maintained based on use of the terminal 100. In addition, the memory 120 may include a high-speed random access memory, or may include a non-volatile memory such as at least one magnetic disk storage device, a flash memory device, or another volatile solid-state storage device.

The other input devices 130 may be configured to: receive input digital or character information, and generate key signal input related to a user setting and function control of the terminal 100. Specifically, the other input devices 130 may include but are not limited to one or more of a physical keyboard, a function key (such as a volume control key or an on/off key), a trackball, a mouse, a joystick, an optical mouse (the optical mouse is a touch-sensitive surface that does not display visual output, or an extension of a touch-sensitive surface formed by a touchscreen), or the like. The other input devices 130 are connected to other input device controllers 161 in the I/O subsystem 160, and exchange a signal with the processor 170 under control of the other input device controllers 161.

The display screen 140 may be configured to display information entered by a user, information provided for the user, and various menus of the terminal 100, and may further accept user input (for example, display current geographical location information and receive a touch operation of the user). Specifically, the display screen 140 may include a display panel 141 and a touch panel 142. The display panel 141 may be configured in a form of a liquid crystal display (Liquid Crystal Display, LCD), an organic light-emitting diode (Organic Light-Emitting Diode, OLED), or the like. The touch panel 142, also referred to as a touchscreen, a touch-sensitive screen, and the like, may collect a touch or non-touch operation performed by the user on or near the touch panel 142 (for example, an operation performed by the user on or near the touch panel 142 by using any appropriate object or accessory such as a finger or a stylus, or a motion sensing operation, where the operation includes an operation type such as a single-point control operation or a multi-point control operation), and drive a corresponding connection apparatus based on a preset program. Optionally, the touch panel 142 may include two parts: a touch detection apparatus and a touch controller. The touch detection apparatus detects a touch location and a touch gesture of a user, detects a signal brought by a touch operation, and sends the signal to the touch controller. The touch controller receives touch information from the touch detection apparatus, converts the touch information into information that can be processed by the processor, sends the information to the processor 170, and can receive and execute a command sent by the processor 170. In addition, the touch panel 142 may be implemented by using a plurality of types such as a resistive type, a capacitive type, an infrared ray type, and a surface acoustic wave type, or the touch panel 142 may be implemented by using any technology developed in the future. Further, the touch panel 142 may cover the display panel 141. The user may perform, based on content displayed on the display panel 141 (the displayed content includes but is not limited to a soft keyboard, a virtual mouse, a virtual key, an icon, image or text information, and the like), an operation on or near the touch panel 142 that covers the display panel 141. After detecting the operation performed on or near the touch panel 142, the touch panel 142 transfers the operation to the processor 170 by using the I/O subsystem 160, to determine user input. Then, the processor 170 provides corresponding visual output on the display panel 141 based on the user input and by using the I/O subsystem 160. In FIG. 1, the touch panel 142 and the display panel 141 serve as two independent components to implement input and output functions of the terminal 100. However, in some embodiments, the touch panel 142 and the display panel 141 may be integrated to implement the input and output functions of the terminal 100.

The audio circuit 150, a speaker 151, and a microphone 152 may provide an audio interface between the user and the terminal 100. The audio circuit 150 may convert received audio data into a signal, and transmit the signal to the speaker 151, and the speaker 151 converts the signal into a sound signal for output. In addition, the microphone 152 converts a collected sound signal into a signal. The audio circuit 150 receives the signal, converts the signal into audio data, and then outputs the audio data to the RF circuit 108, to send the audio data to, for example, another mobile phone, or outputs the audio data to the memory 120 for further processing.

The I/O subsystem 160 is configured to control an external input/output device, and may include the other input device controllers 161, a sensor controller 162, and a display controller 163. Optionally, one or more other input control device controllers 161 receive a signal from the other input devices 130 and/or send a signal to the other input devices 130. The other input devices 130 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the other input control device controllers 161 may be connected to any one or more of the foregoing devices. The display controller 163 in the I/O subsystem 160 receives a signal from the display screen 140 and/or sends a signal to the display screen 140. After the display screen 140 detects user input, the display controller 163 converts the detected user input into interaction with a user interface object displayed on the display screen 140, that is, implements man-machine interaction. The sensor controller 162 may receive a signal from one or more sensors 150 and/or send a signal to one or more sensors 150.

The processor 170 is a control center of the terminal 100, connects all parts of the entire mobile phone by using various interfaces and lines. By running or executing a software program and/or a module stored in the memory 120 and by invoking data stored in the memory 120, the processor 170 performs various functions of the terminal 100 and processes data, to perform overall monitoring on the mobile phone. Optionally, the processor 170 may include one or more processing units. Preferably, an application processor and a modem processor may be integrated into the processor 170. The application processor mainly processes an operating system, a user interface, an application program, and the like. The modem processor mainly processes wireless communication. It can be understood that the modem processor may not be integrated into the processor 170.

The terminal 100 further includes the power supply 180 (such as a battery) that supplies power to each component. Preferably, the power supply may be logically connected to the processor 170 by using a power management system, to implement functions such as charging management, discharging management, and power consumption management by using the power management system.

Although not shown in the figure, the terminal 100 may further include at least one type of sensor such as a light sensor, a motion sensor, and another sensor. As a type of motion sensor, an accelerometer sensor may detect a value of acceleration in each direction (usually there are three axes); may detect a value and a direction of gravity when the accelerometer sensor is static; and may be configured to determine a movement direction, a movement speed, and the like, and may provide a navigation service based on the determined movement direction and movement speed. Other sensors such as a barometer, a hygrometer, a thermometer, and an infrared sensor may be further disposed on the terminal 100 to detect weather and user health, and details are not described herein.

In addition, the terminal 100 may further include a camera, a Bluetooth module, and the like, and details are not described herein.

Figure 2:
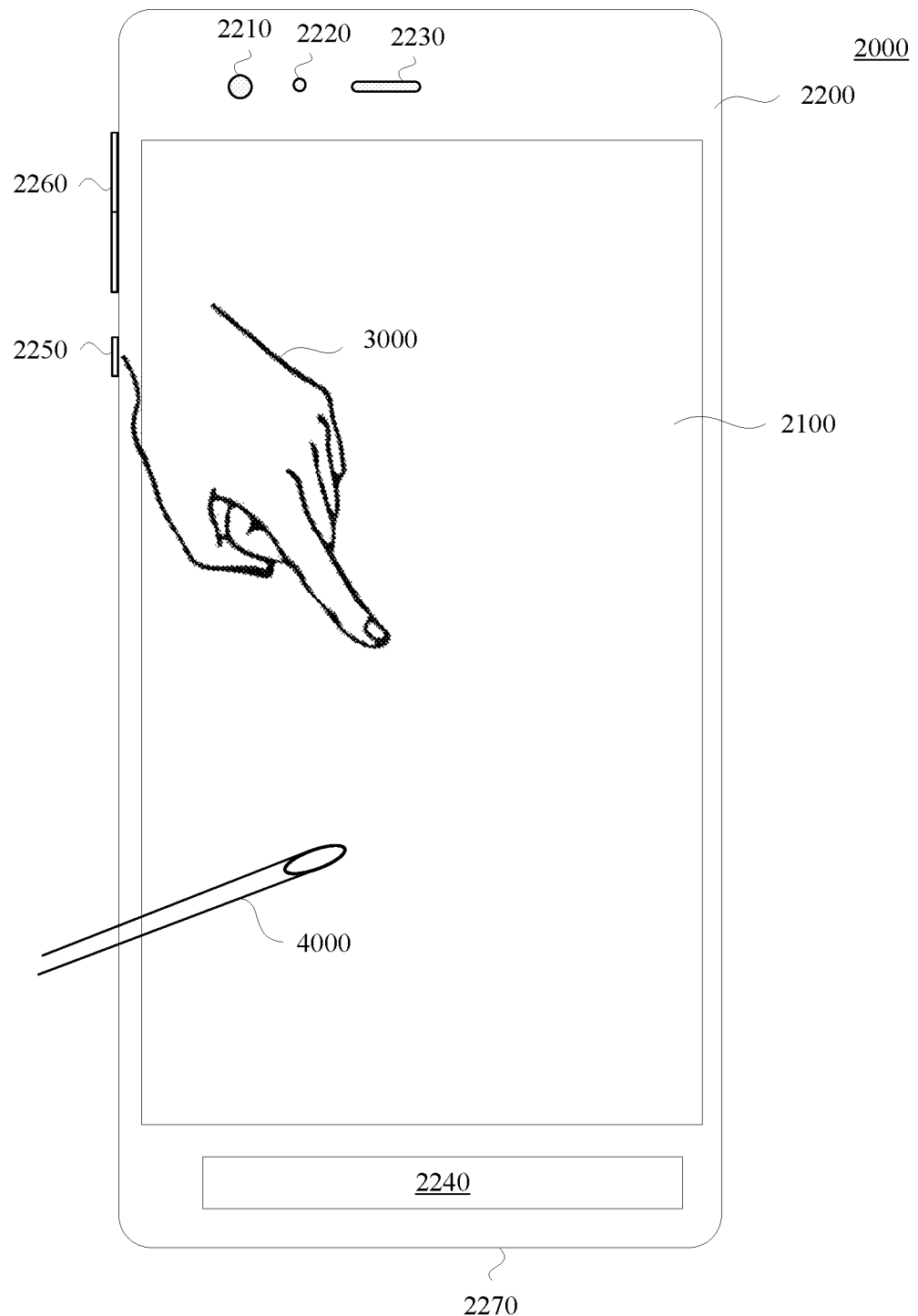
FIG. 2 is a schematic structural diagram of a mobile phone according to an embodiment of the present invention.

The following further describes the embodiments of the present invention by using a mobile phone as an example. FIG. 2 is a schematic diagram of a partial structure of a mobile phone 2000 related to an embodiment of the present invention. Referring to FIG. 2, the mobile phone 200 includes a housing 2200 and a display screen 2100. The display screen 2100 may be a touchscreen. The touchscreen may implement input and output functions of the mobile phone 2000 by integrating a touch panel and a display panel. A user may perform an operation such as tapping and sliding on the touchscreen by using a finger 3000 and a stylus 4000. Some user operations with a specific gesture, in a specific tapping manner, and in a specific sliding manner may be used to instruct the mobile phone to perform specific actions. For example, the specific tapping manner may include double-tapping, and the specific gesture may include drawing a circle, drawing a "V", sliding with two touch points approaching to each other (a two-finger operation), sliding with two touch points opposite to each other, or the like. The housing 2200 includes a camera 2210, a photosensitive element 2220, an earpiece 2230, an entity button 2240, a power button 2250, a volume button 2260, and the like. The camera 2210 may include a front-facing camera and a rear-facing camera. The photosensitive element 2220 is mainly configured to sense a distance between a human body and the mobile phone. For example, when a user is on a call, the mobile phone is next to an ear, and after the photosensitive element 2220 detects the distance information, the touchscreen of the mobile phone 2000 may disable an input function to prevent an accidental touch. The entity button 2240 is usually a home button, or may be a home button that integrates a fingerprint recognition module. The entity button 2240 may further include a return button, a menu button, and an exit button. In addition, the entity button 2240 may be a touch key at a specified location on the touchscreen. It should be learned that although not shown in the figure, a microphone, a data port, a subscriber identity module (Subscriber Identification Module, SIM) card interface, a headset jack, and the like may be further included in this embodiment of the present invention.

It should be learned that the mobile phone 2000 shown in FIG. 2 is merely an example and constitutes no limitation, and may include more or fewer components than those shown in the figure, or combine some components, or split some components, or have different component arrangements.

Figure 3A:
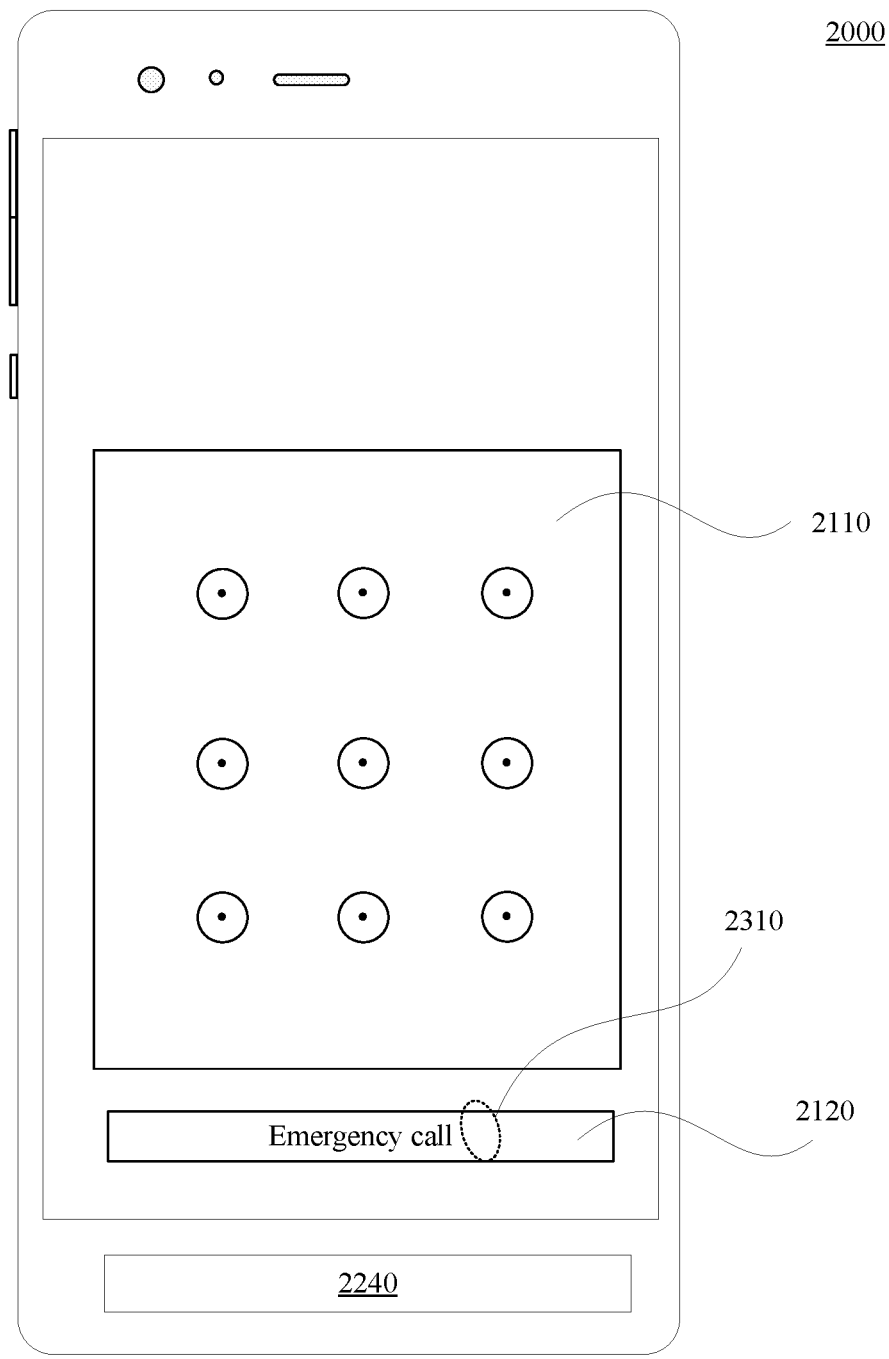
FIG. 3A shows an example of a mobile phone according to an embodiment of the present invention.

FIG. 3A to FIG. 3K show examples of a mobile phone according to an embodiment of the present invention. As shown in FIG. 3A, a mobile phone 2000 may enter a user interface in a locked state by using a power button, a home button, or the like, and after receiving an unlock operation and verifying that the unlock operation is valid, the mobile phone 2000 may enter an operation interface. As shown in FIG. 3A, the user interface in the locked state is displayed on a display screen. The interface may display prompt information for the unlock operation, such as fingerprint unlock, pattern unlock, password unlock, or sliding unlock. For example, the prompt information is a pattern unlock prompt 2110 shown in FIG. 3A. The interface further provides an emergency call interface. An emergency call service may be triggered by using the interface, so that an emergency call screen is entered. When a user touch point 2310 shown in FIG. 3A is on an emergency call interface 2120, the terminal 2000 may enter an emergency call screen shown in FIG. 3B.

Figure 3B:
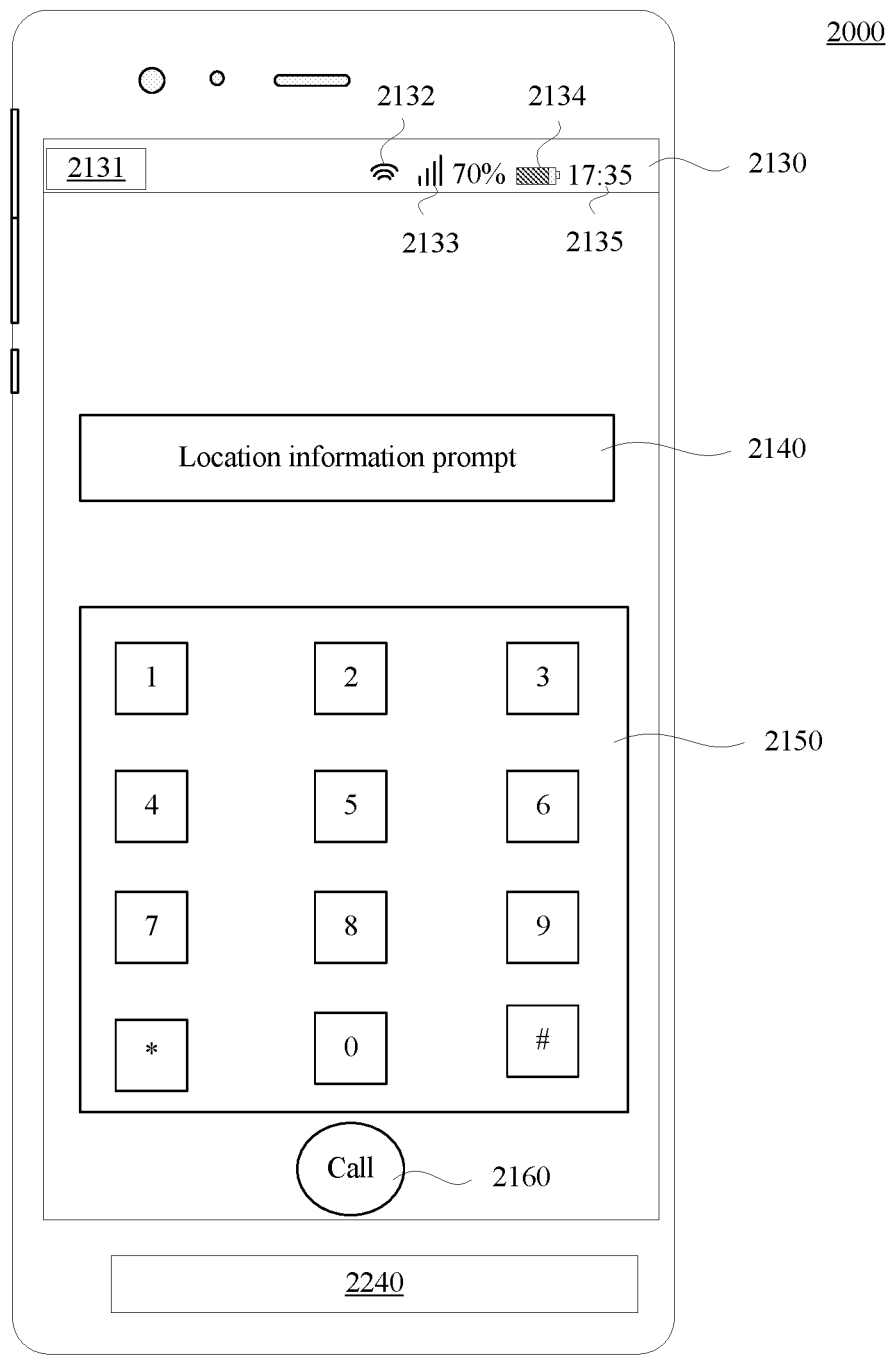
FIG. 3B shows another example of a mobile phone according to an embodiment of the present invention.
Figure 3C:
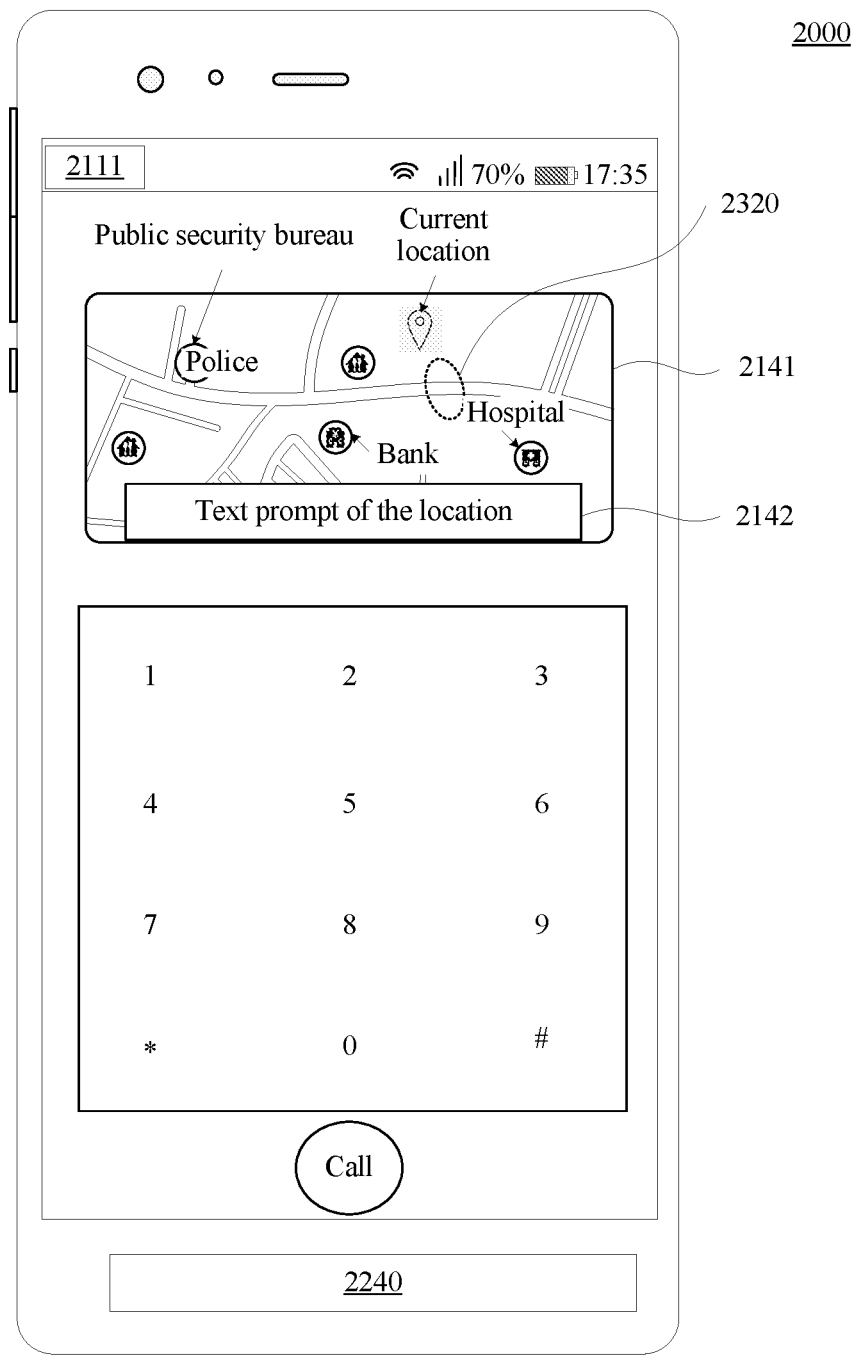
FIG. 3C shows still another example of a mobile phone according to an embodiment of the present invention.
Figure 3D:
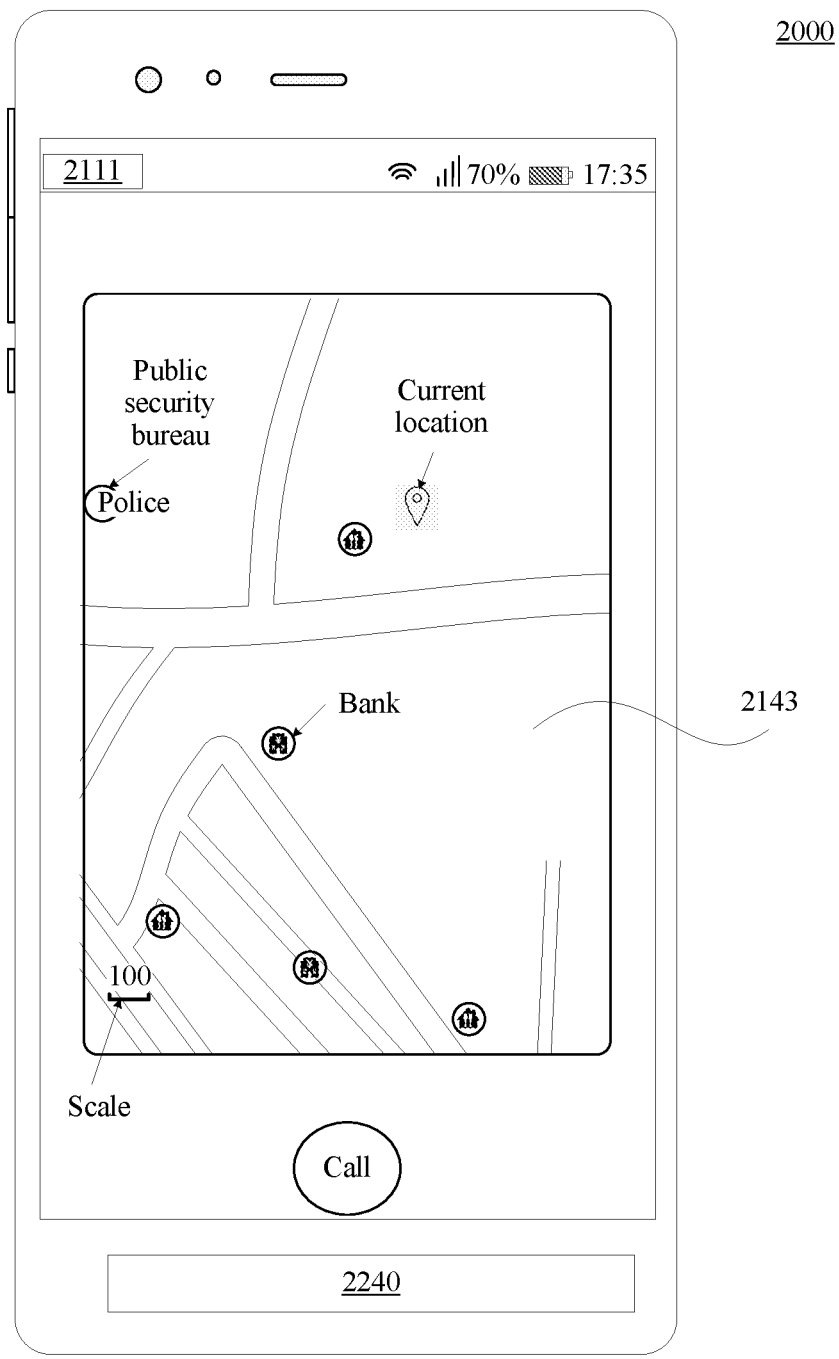
FIG. 3D shows yet another example of a mobile phone according to an embodiment of the present invention.

As shown in FIG. 3B, the emergency call screen may include a status bar 2130, a location information prompt 2140, a virtual dial pad 2150, a call button 2160, and the like. A number that needs to be called may be entered by using the virtual dial pad 2150, and an emergency call is triggered by using the call button 2160. The emergency call screen may further display current geographical location information. The geographical location information may be displayed in a text form, a map form, or a combination thereof. The current geographical location information in the text form may include: description of a current location, a nearby rescue organization, a distance between a nearby rescue organization and a current location, a contact method of a rescue organization, and the like. For example, the rescue organization may be a hospital, a public security bureau, and the like. The contact method may be an emergency telephone number. The current geographical location information in the map form may further include information that helps determine a specific location, for example, a mark of a current location, a mark of a nearby rescue organization, a mark of a nearby well-known building or authority, and the like. The current location in the map form may be displayed on the emergency call screen by using a thumbnail view or by using a detailed view in a full-screen mode. As shown in FIG. 3C, a thumbnail view 2141 and text description 2142 of location information are displayed on an upper part of the virtual dial pad 2150. The thumbnail view 2141 includes a mark of a current location, a mark of a public security bureau, a mark of a hospital, and a mark of a bank, and the like. When a user touch point 2320 is on the thumbnail view, an emergency call screen shown in FIG. 3D that displays a detailed view 2143 may be entered. On the emergency call screen, after a user operation is received, the detailed view displayed on the emergency call screen may be zoomed in, zoomed out, or moved, to display more information. The user operation herein may include double-tapping, sliding, and the like. Zooming in or zooming out the detailed view means increasing or reducing a scale of the detailed view.

Figure 3E:
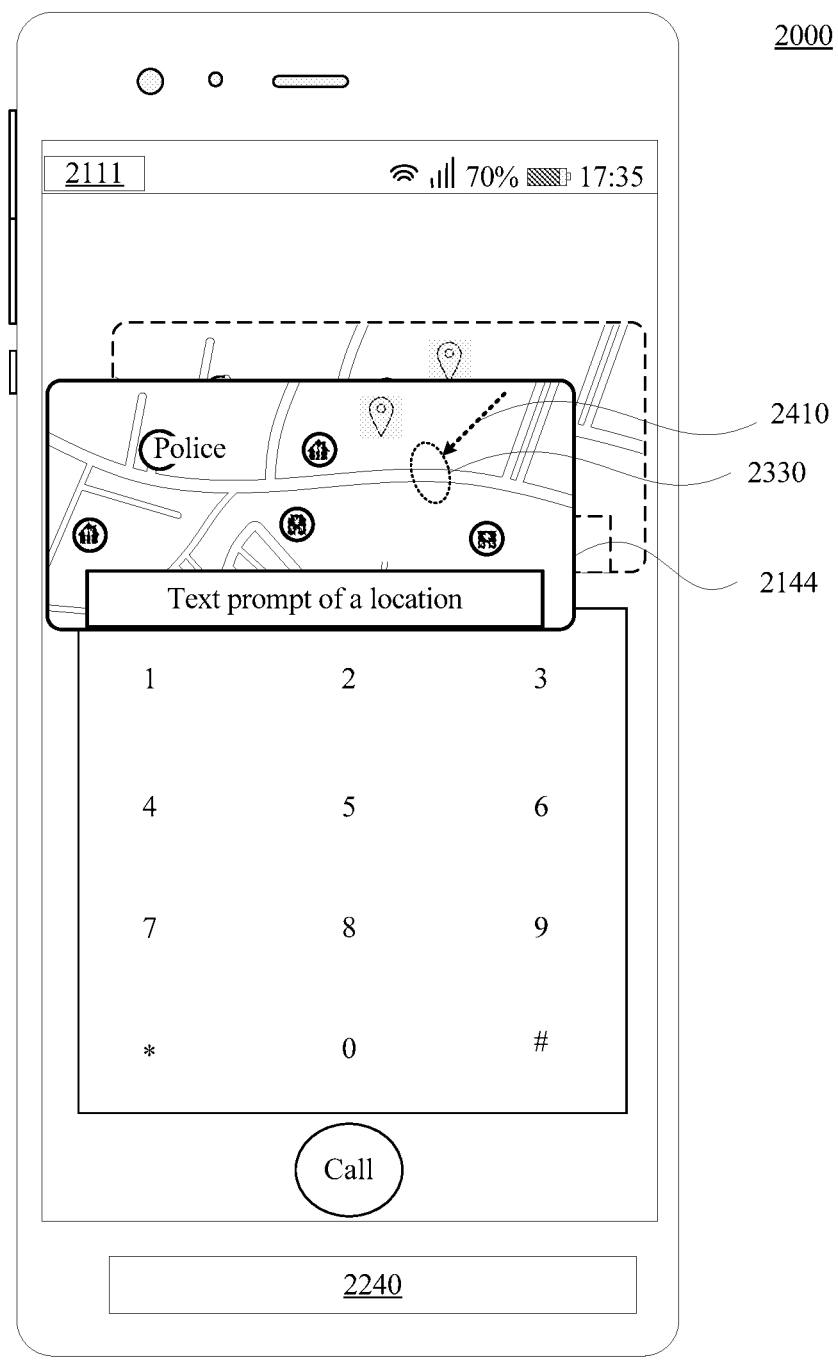
FIG. 3E shows yet another example of a mobile phone according to an embodiment of the present invention.

In an example, a floating window is presented on the emergency call screen, and the geographical location information is presented in the floating window. As shown in FIG. 3E, an emergency call screen may display a floating window 2144, and the floating window may present a thumbnail view and text description of location information. In addition, the floating window may be controlled to display at any location on the emergency call screen. As shown in FIG. 3E, a user touch point 2330 is in the floating window and the floating window is dragged along a track 2410. In this way, a location of the floating window on the emergency call screen can be adjusted randomly.

In addition, the emergency call screen may further include a status bar. The status bar may be used to display one or more pieces of the following information: an operator name 2131 (such as China Mobile or China Unicom), a Wireless Fidelity (Wireless Fidelity, Wi-Fi) status control icon 2132 (for example, Wi-Fi signal strength may be displayed), a mobile communication signal status control icon 2133 (for example, strength of a mobile communication signal may be displayed, and for a multi-SIM multi-standby mobile phone, strength of a plurality of mobile communication signals may be displayed), a battery level status control icon 2134, a local time 2135, and the like.

Figure 3F:
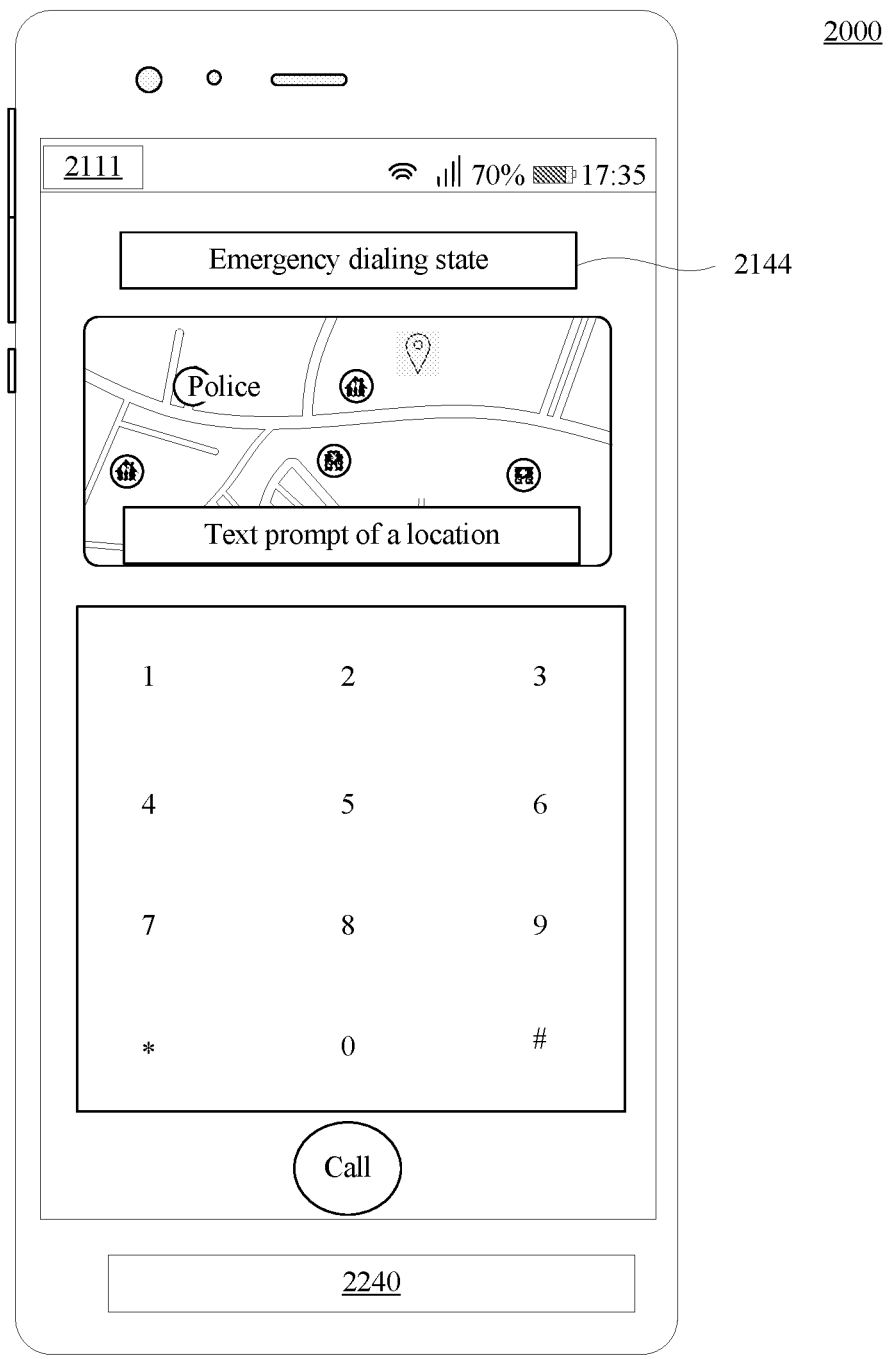
FIG. 3F shows yet another example of a mobile phone according to an embodiment of the present invention.

In addition, as shown in FIG. 3F, an emergency dial interface may further display a call status 2144, for example, during call initiation or on a call, and may further display a number of an emergency call.

Figure 3G:
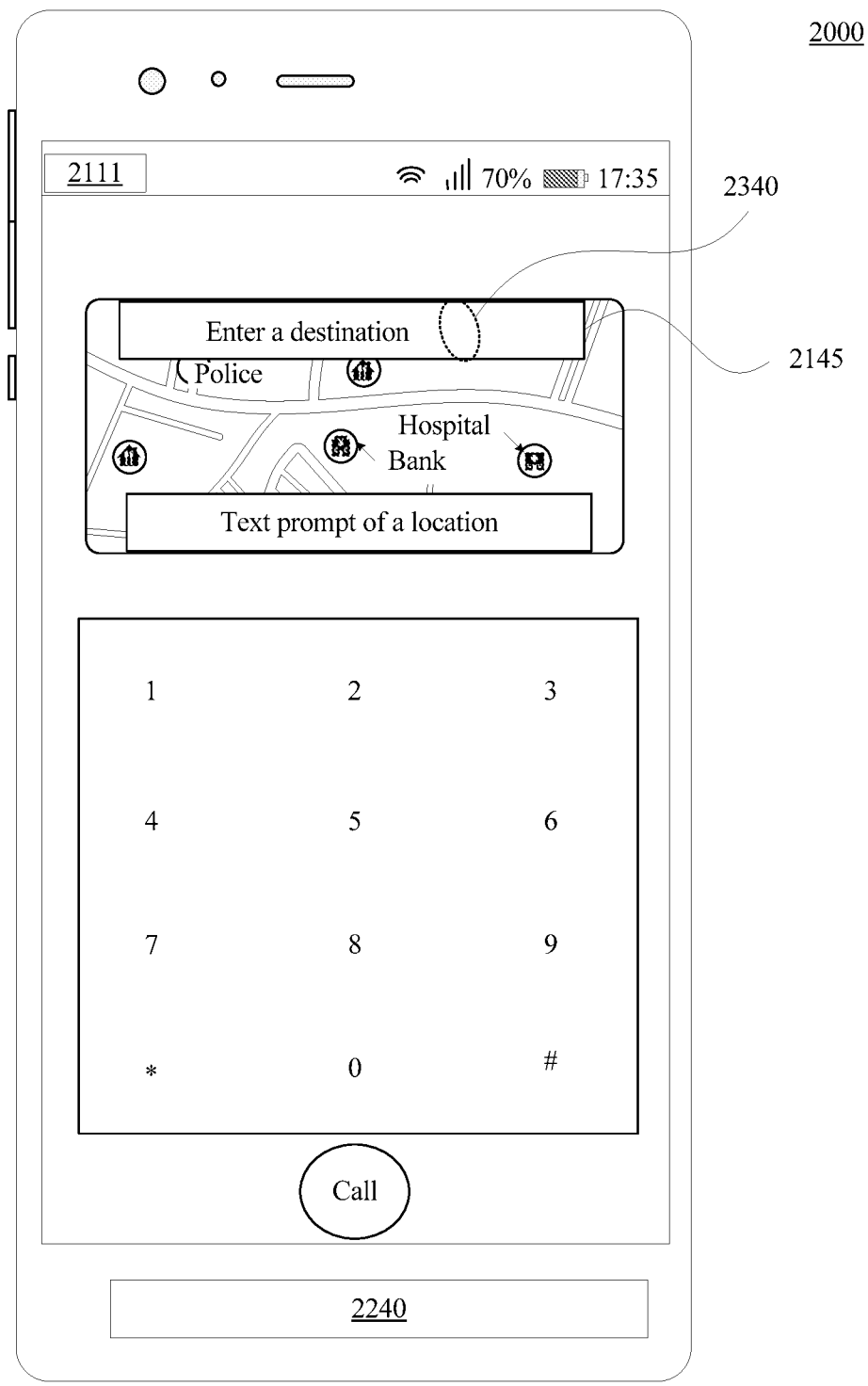
FIG. 3G shows yet another example of a mobile phone according to an embodiment of the present invention.
Figure 3H:
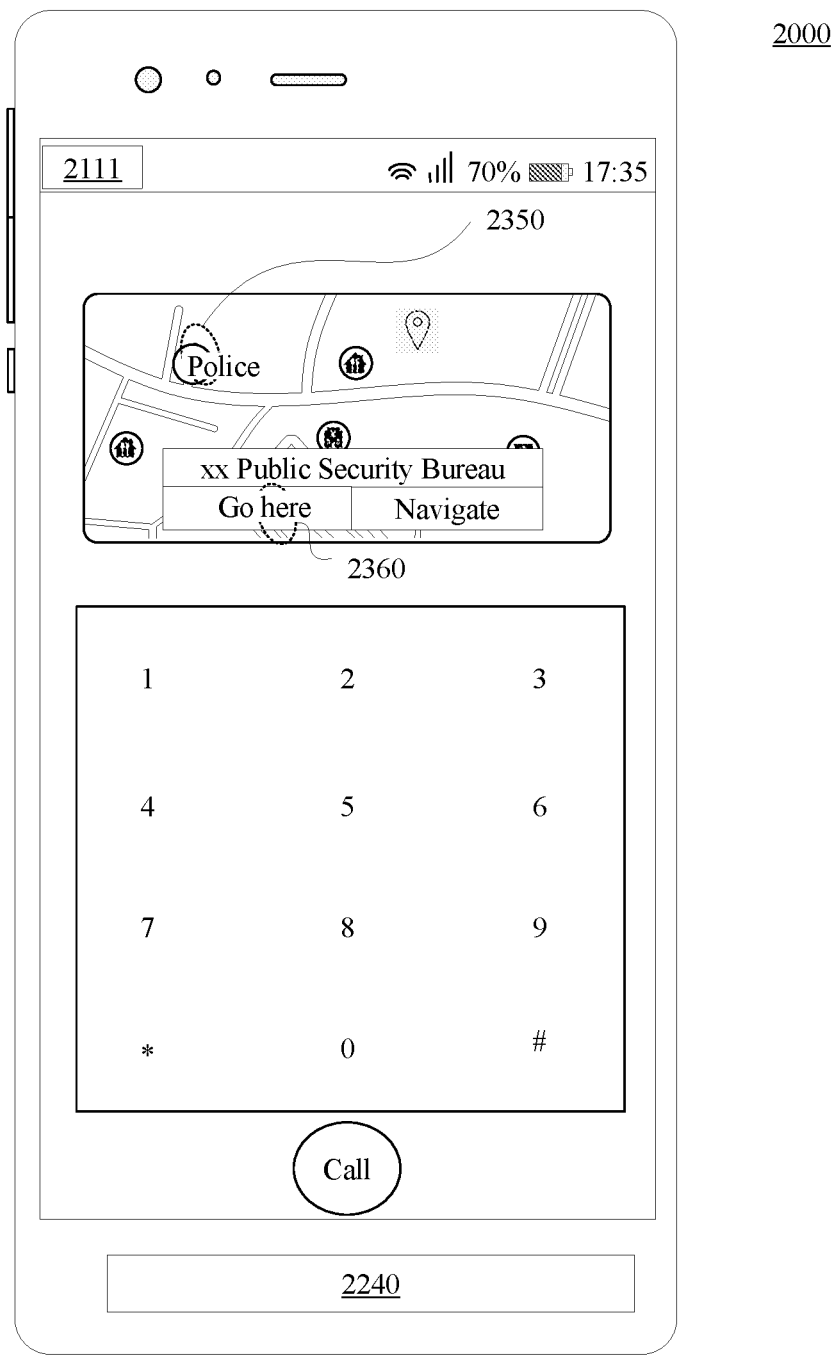
FIG. 3H shows yet another example of a mobile phone according to an embodiment of the present invention.
Figure 3I:
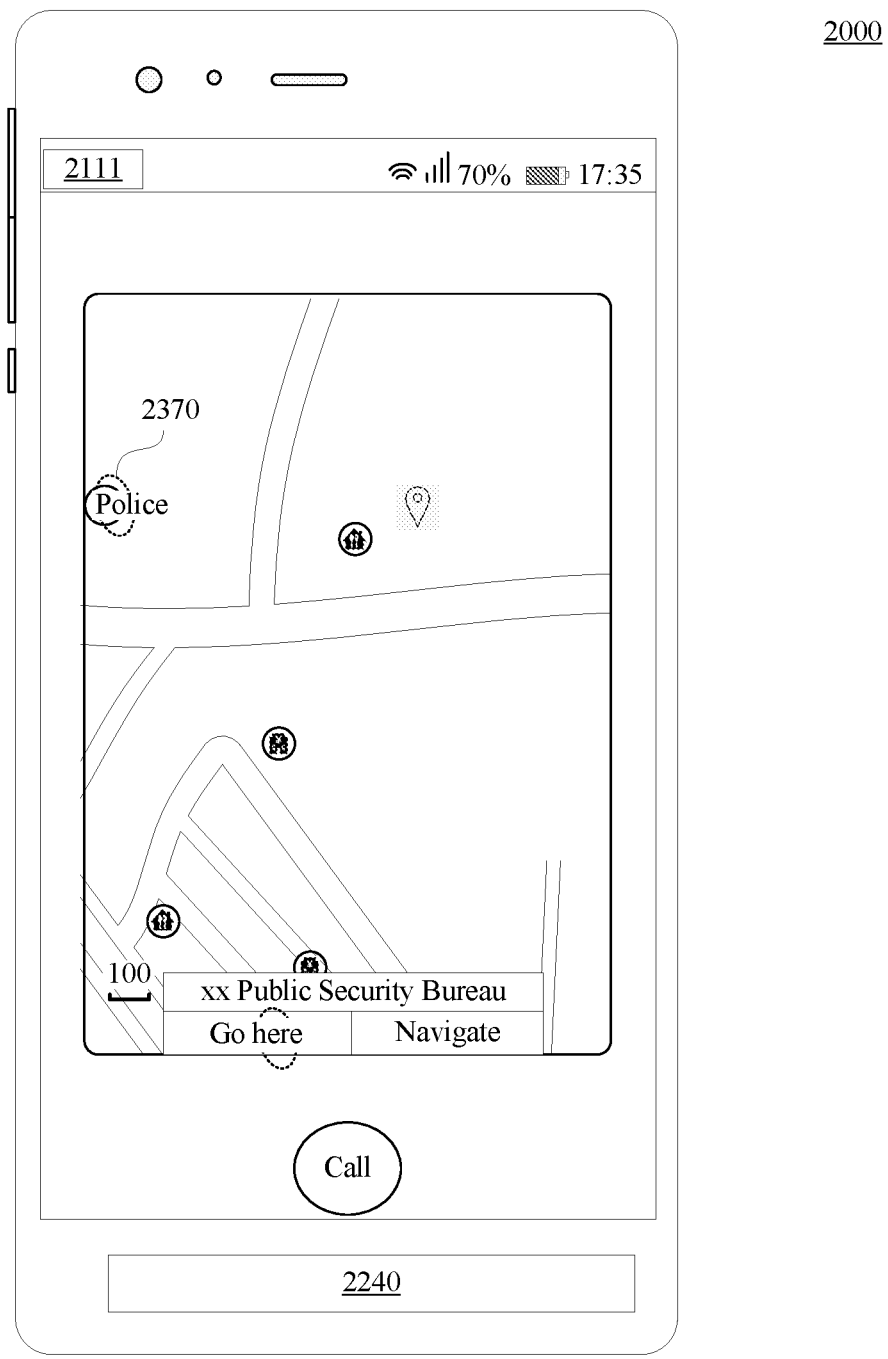
FIG. 3I shows yet another example of a mobile phone according to an embodiment of the present invention.

Next, with reference to the implementation of displaying the current geographical location information in the map form, in this embodiment of the present invention, a navigation service may be further provided for the user on the emergency call screen. As shown in FIG. 3G, an emergency call screen may display a navigation service interface 2145. When a user touch point 2340 is on the navigation service interface 2145, the terminal may begin to provide a navigation service. Further, before beginning navigation, the terminal may prompt the user to enter a destination. The destination may be a destination address entered by using a virtual keyboard, or may be a destination address obtained by recognizing input voice, or may be a destination address obtained by the user based on a location tapped by the user in a map in a user interface. As shown in FIG. 3H, when a user touch point 2350 is at a location of an icon of a public security bureau in a thumbnail view, an emergency call screen may display information about the public security bureau such as a name of the public security bureau in a form of xx Public Security Bureau, and may further provide a navigation interface. A navigation service may be further classified into a plurality of types of services, for example, displaying only information about a route from a current geographical location to a destination address, and updating in real time information about a route from a current geographical location to a destination address. A user touch point 2360 may be used to enable the terminal to provide any one of the services. During navigation, the information about the route from the current geographical location to the destination address may be displayed by using a detailed view. As shown in FIG. 3I, a navigation service may be further enabled when an emergency call screen displays a detailed view. When a user touch point 2370 is at a location of an icon of a public security bureau in the detailed view, the emergency call screen may display information about the public security bureau, and navigation in which the public security bureau is used as a destination may be triggered by using the user touch point 2370.

Figure 3J:
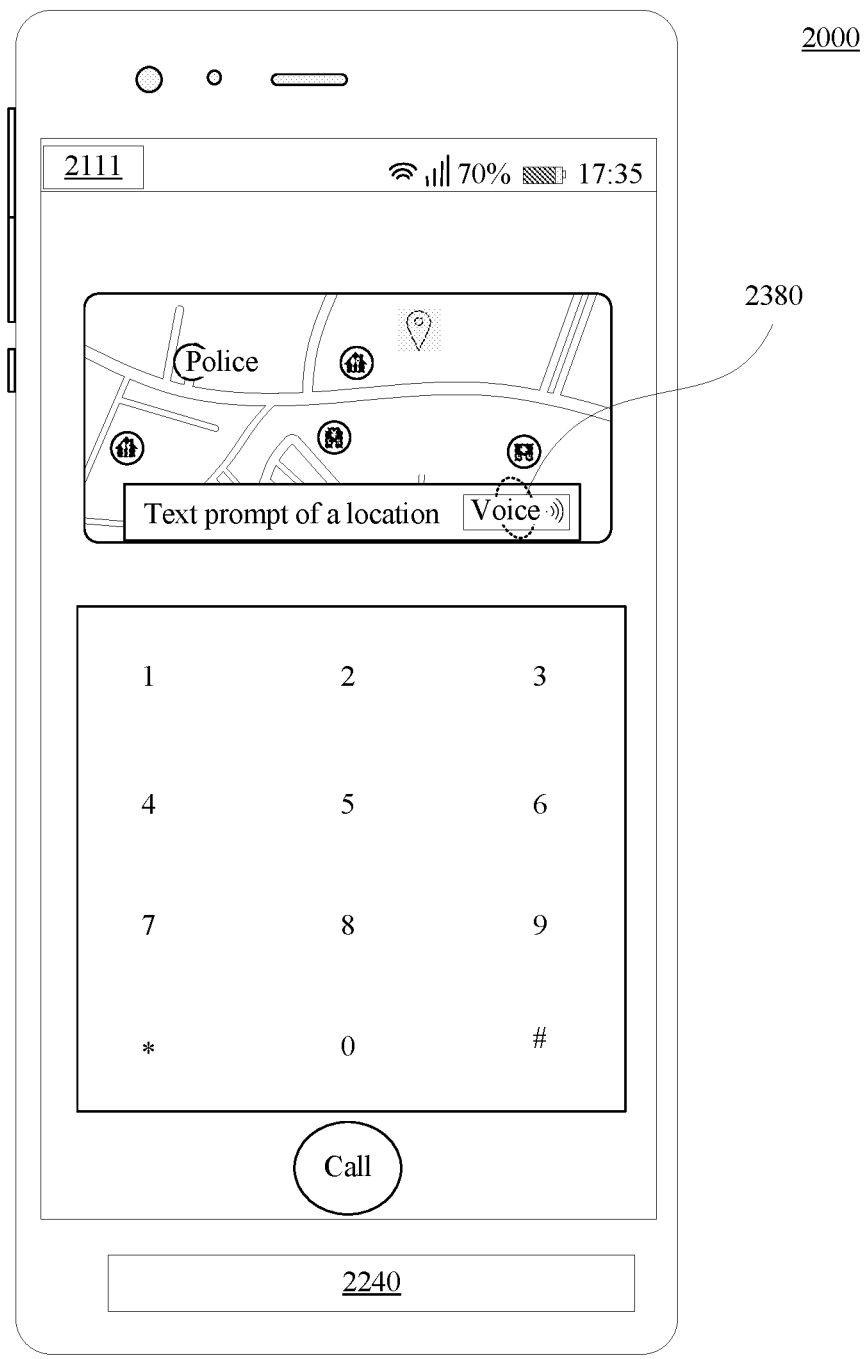
FIG. 3J shows yet another example of a mobile phone according to an embodiment of the present invention.

In still another example, the mobile phone plays voice corresponding to the current geographical location information. As shown in FIG. 3J, an emergency call screen may display a function key for playing the voice corresponding to the current geographical location information. Voice play of the current geographical location information may begin by tapping the voice play function key by using a user touch point 2380.

Figure 3K:
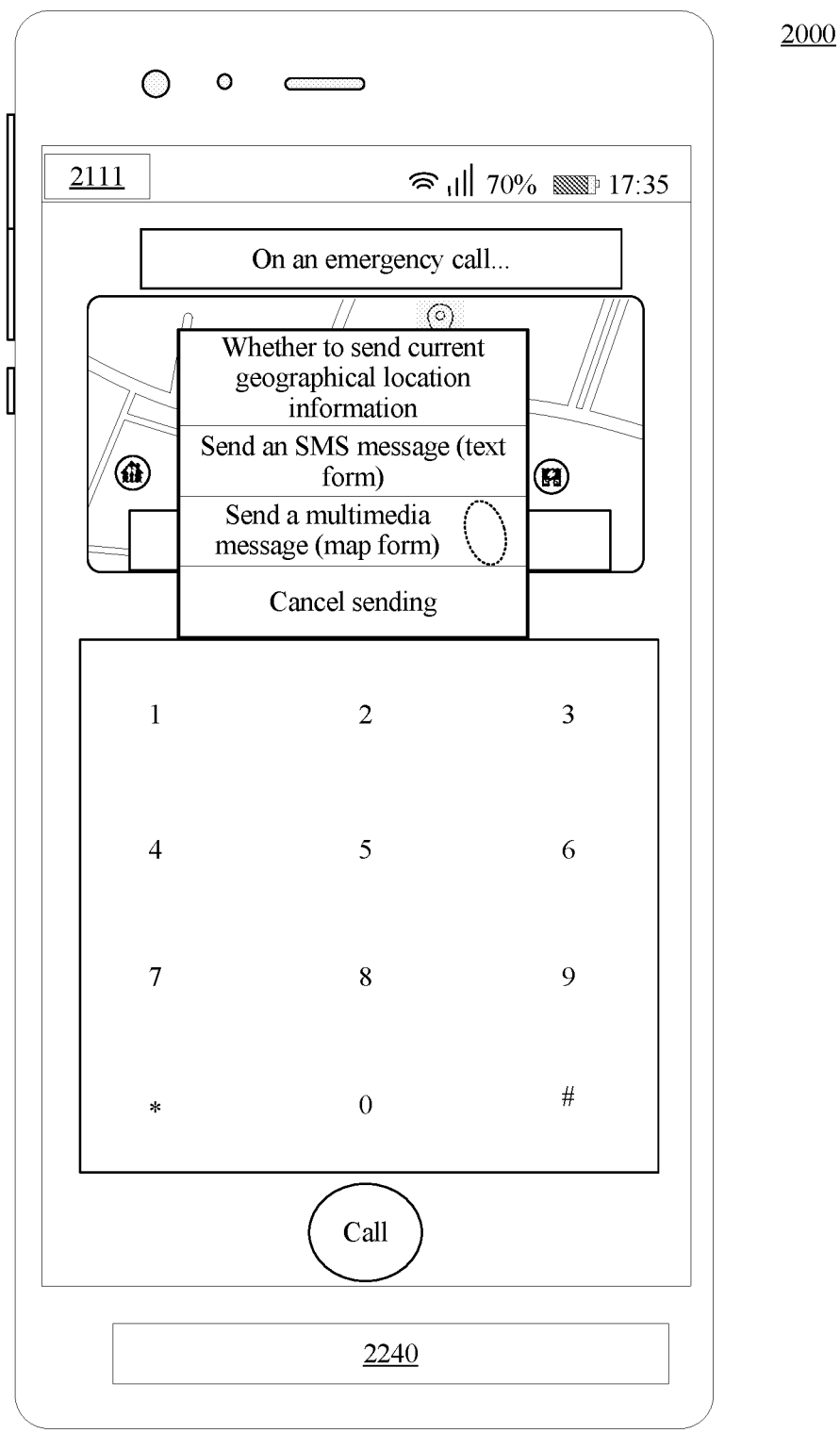
FIG. 3K shows yet another example of a mobile phone according to an embodiment of the present invention.

In yet another example, sending of geographical location information presented on a current emergency call screen to a called party of an emergency call may be triggered by using an interface provided on the emergency call screen or a specific user operation. As shown in FIG. 3K, after a trigger operation of a user for sending the current geographical location information to the called party of the emergency call is received, the emergency call screen displays a menu for selecting a sending manner. The sending manner includes but is not limited to sending an SMS message and sending a multimedia message. In the SMS message sending manner, the current geographical location information in the text form may be sent. In the multimedia message sending manner, the current geographical location information in the map form may be sent.

In this embodiment of the present invention, navigation may be implemented on the emergency call screen by using the terminal. In this way, a self-rescue probability of the user in case of emergency is increased. In addition, after initiating an emergency call, the user may agree with a party that provides an emergency rescue service about a location that facilitates search and rescue, and the user may wait for the search and rescue at the location, thereby improving a rescue success rate.

The following further describes the embodiments of the present invention with reference to the accompanying drawings.

Figure 4:
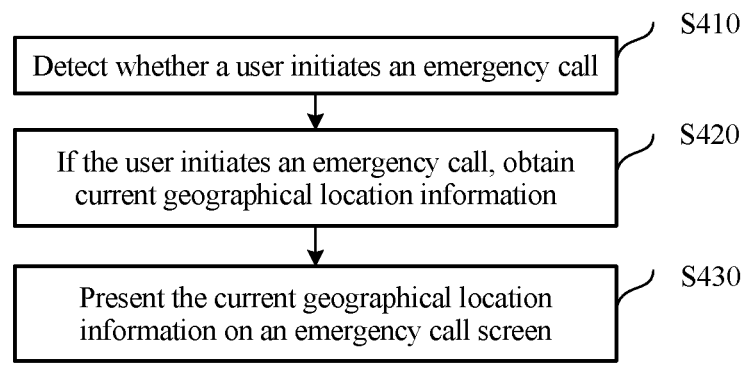
FIG. 4 is a flowchart of a method for displaying current geographical location information on an emergency call screen according to an embodiment of the present invention.

FIG. 4 is a flowchart of a method for displaying current geographical location information on an emergency call screen according to an embodiment of the present invention. As shown in FIG. 4, the method specifically includes the following steps.

S410. Detect whether a user initiates an emergency call.

When the user needs to initiate an emergency call, a terminal receives a trigger operation of the user, and the operation is used to instruct to initiate the emergency call.

An emergency telephone number may be a rescue telephone number such as 911 or 110, or may be an emergency contact preset by the user, for example, a family member or a friend.

For example, as shown in FIG. 3A, the user may tap an emergency call interface in a user interface in a locked state. An operation of tapping the emergency call interface is a trigger operation. The operation of tapping the emergency call interface is used to instruct to enter an emergency call screen. In this case, it may be considered that the user initiates an emergency call. Alternatively, the user may trigger, after unlocking a user interface in a locked state, an operation for initiating an emergency call.

For another example, after the terminal displays the emergency call screen, the user enters an emergency call number, and triggers the call. The triggering the call is a trigger operation, and is used to instruct to initiate a call corresponding to the emergency call number.

S420. If the user initiates an emergency call, obtain current geographical location information.

After receiving a user operation, the terminal invokes a locally installed map application to obtain the current geographical location information, or when no map application is locally installed, the terminal obtains the current geographical location information through a Wireless Fidelity network by using a server. For example, the terminal obtains coordinates of a current location.

S430. Present the current geographical location information on the emergency call screen, where a presentation form includes at least one of the following: a text form and a map form.

After obtaining the location coordinates, the terminal generates the current geographical location information with reference to the location coordinates. The current geographical location information may be generated at least in the following manners:

I. The terminal directly downloads the current geographical location information from a geographic information system (Geographic Information System, GIS). The terminal may visit the GIS through a mobile communications network, or may visit the GIS through a wired network accessed through Wireless Fidelity (Wireless Fidelity, Wi-Fi).

II. The terminal determines the coordinates of the current location by using a Global Positioning System (Global Positioning System, GPS), and generates the current geographical location information with reference to the coordinates of the current location and a locally stored map.

III. The terminal determines the current geographical location information through Wi-Fi.

In an example, the terminal may present only the coordinates of the current location on the emergency call screen. For example, in actual application, the terminal may fail or may not access the mobile communications network or Wi-Fi, and stores no map locally. In this case, the terminal may display the obtained location coordinates, namely, longitude and latitude information of the current location, on the emergency call screen.

In this embodiment of the present invention, when using the terminal to initiate an emergency call, the user can confirm the current geographical location information on the emergency call screen, so that after the emergency call is answered, the user can inform, based on the current geographical location information, a called party of the current geographical location information displayed on the emergency call screen. In this way, the called party can provide a rescue service more properly and in a more timely manner.

In an embodiment, the mobile terminal may obtain movement data of the user in real time by using a sensor, for example, a movement speed and a movement location of the user, and update the current geographical location information on the emergency call screen in real time. The current geographical location information presented on the emergency call screen may be updated at a specified cycle.

In another embodiment, after the current geographical location information is presented in the map form on the emergency call screen, the terminal receives a user operation, and the user operation includes a destination address and instructs the terminal to enable a service to navigate from the current geographical location to the destination address.

In still another embodiment, a floating window is presented on the emergency call screen, and the geographical location information is presented in the floating window.

In yet another embodiment, the geographical location information presented on the current emergency call screen is sent to a called party of the emergency call.

In yet another embodiment, after the current geographical location information is obtained (the emergency call screen presents the current geographical location information), the user is on an emergency call, and the mobile phone plays voice corresponding to the current geographical location information.

The following describes the embodiments of the present invention in more details with reference to the accompanying drawings.

Figure 5:
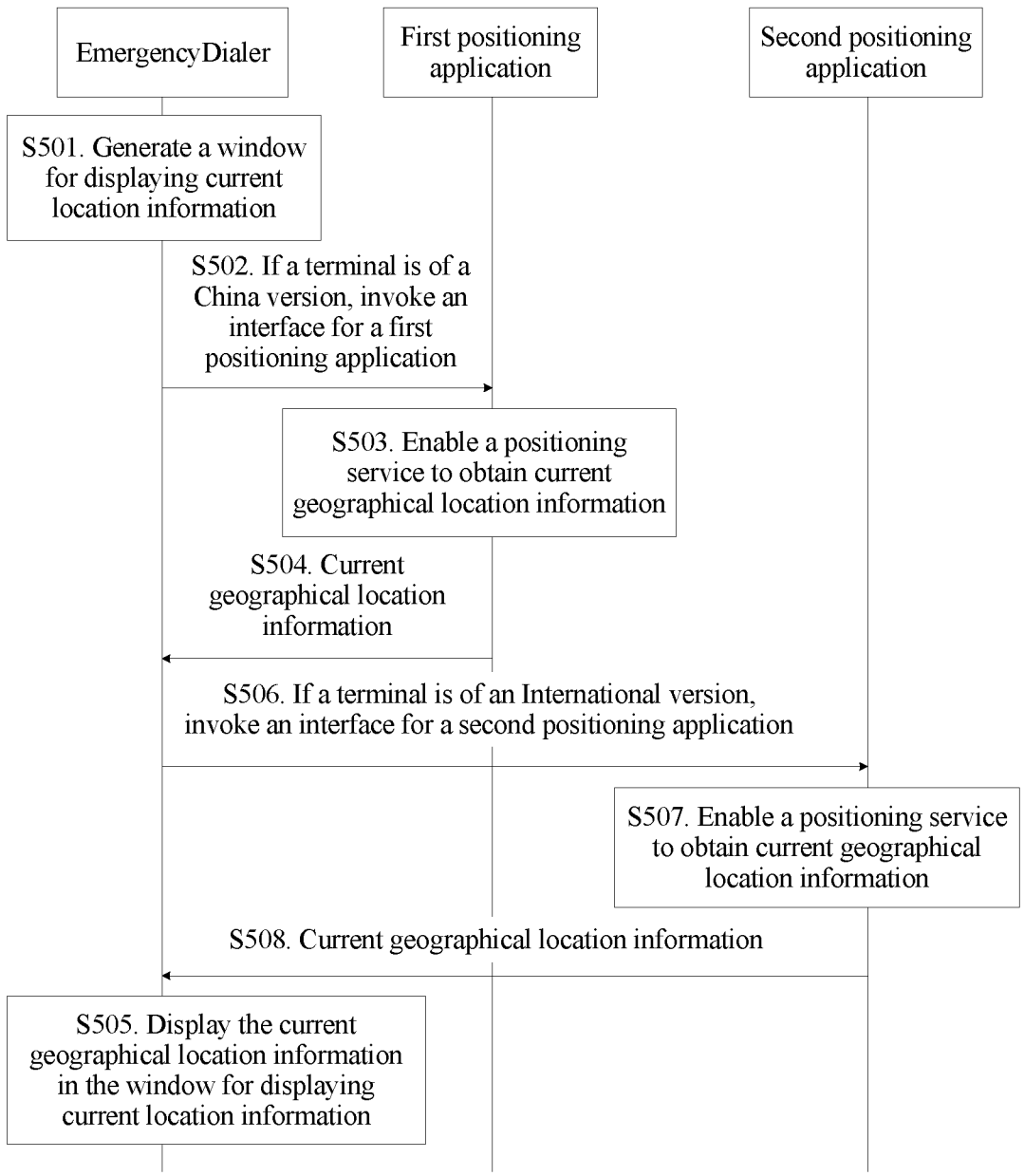
FIG. 5 shows an example according to an embodiment of the present invention.

FIG. 5 shows an example according to an embodiment of the present invention. As shown in FIG. 5, when performing the method, a terminal may create an EmergencyDialer (emergency dialer) thread and a positioning application thread. Specifically, the following steps need to be performed to run the method.

S501. After receiving a user operation, the terminal enters an emergency dial pad, and EmergencyDialer begins to generate a window for displaying current geographical location information.

Figure 6:
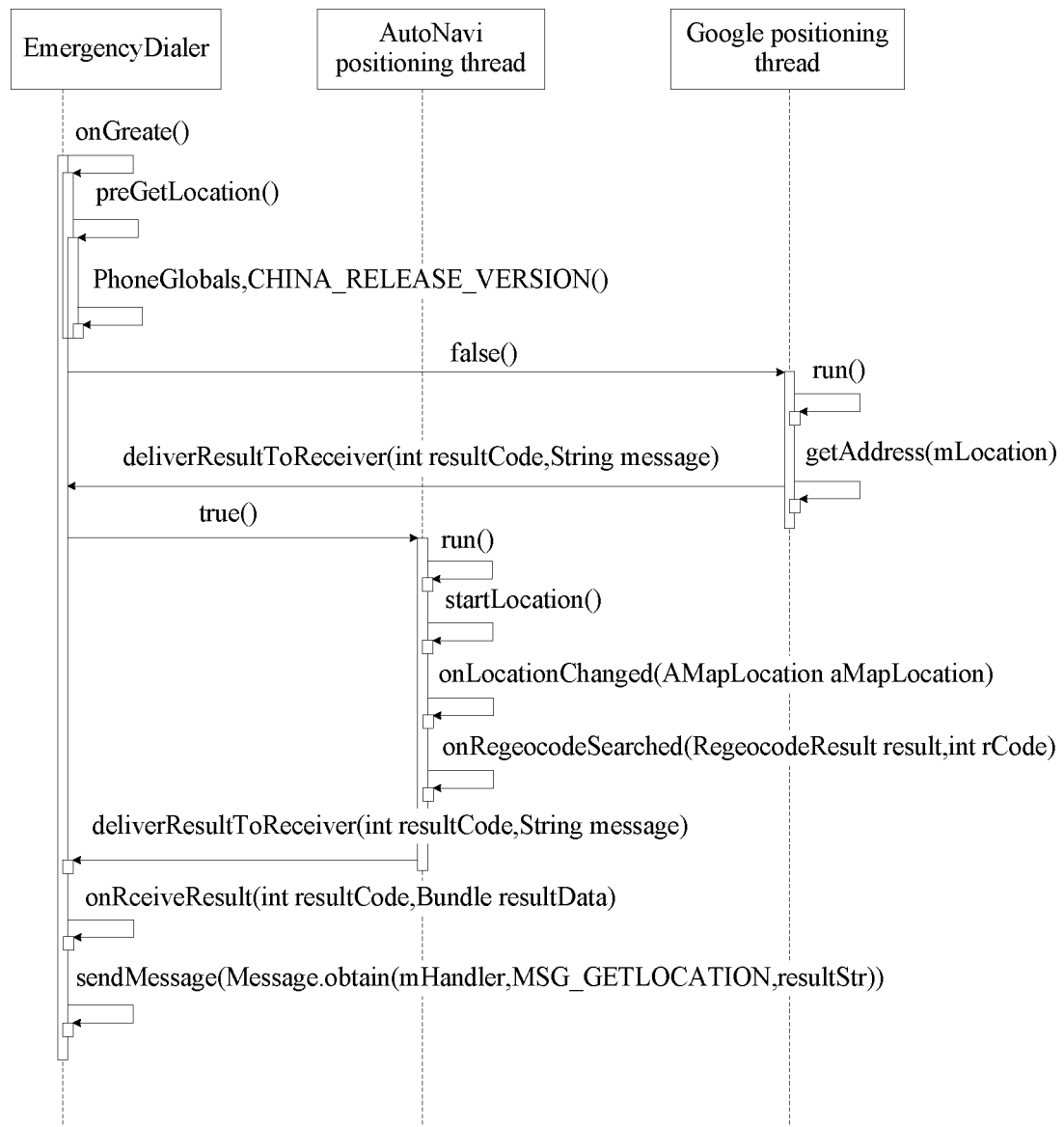
FIG. 6 is a thread time sequence diagram of an example according to an embodiment of the present invention.

For example, FIG. 6 is a thread time sequence diagram of an example according to an embodiment of the present invention. As shown in FIG. 6, generation of the window for displaying current geographical location information may begin by using an onGreate command.

S502. If the terminal is of a China version, EmergencyDialer invokes an interface for a first positioning application, where the first positioning application is used for positioning in a China region, for example, the Amap or the Baidu Map.

For example, as shown in FIG. 6, a positioning application interface may be invoked by using a preGetLocation command. A device version of the terminal is determined by using a PhoneGlobals,CHINA_RELEASE_VERSION command, that is, whether the terminal is of the China version is determined.

S503. The first positioning application starts a thread to enable a positioning service and obtain current geographical location information.

In this procedure, for a terminal that implements positioning by accessing the Internet through Wi-Fi, when Wi-Fi is available, the first position application starts a thread, to begin to obtain a current geographical location, and returns a positioning result by using a location interface. When no network is available, Wi-Fi status change broadcast is registered, to obtain location information when Wi-Fi is connected.

For example, as shown in FIG. 6, the following commands may be sequentially executed to start a thread, to begin to obtain the current geographical location information:

run,
startLocation,
onLocationChanged(AMapLocation aMapLocation),
onRegeocodeSearched(RegeocodeResult result,int rCode).

S504. The first positioning application returns the current geographical location information to EmergencyDialer by using a location interface.

For example, as shown in FIG. 6, the current geographical location information is returned to EmergencyDialer by using a deliverResultToReceiver(int resultCode,String message) command.

S505. EmergencyDialer displays the current geographical location information in the window for displaying current geographical location information, where the window for displaying current geographical location information is at a specific location in the emergency dial pad.

For example, as shown in FIG. 6, the following commands may be sequentially executed to start a thread, so as to display the current geographical location information in the window for displaying current geographical location information:

onRceiveResult(int resultCode,Bundle resultData),
sendMessage(Message.obtain(mHandler,MSG GETLOCATION,resultStr)).

In another example, after S501, the method further includes the following steps.

S506. If the terminal is of an International version, EmergencyDialer invokes an interface for a second positioning application, where the second application is used for international positioning, for example, the Google Maps.

S507. The second positioning application starts a thread to enable a positioning service and obtain current geographical location information.

For example, as shown in FIG. 6, the current geographical location information may be obtained by using a getAddress (mLocation) command.

In this procedure, for a terminal that implements positioning by accessing the Internet through Wi-Fi, when Wi-Fi is available, the second positioning application starts a thread, to begin to obtain a current geographical location, and returns a positioning result by using a location interface. When no network is available, Wi-Fi status change broadcast is registered, to obtain location information when Wi-Fi is connected. S508. The second positioning application returns the current geographical location information to EmergencyDialer by using a location interface.

S505. EmergencyDialer displays the current geographical location information in the window for displaying current geographical location information, where the window for displaying current geographical location information is at a specific location in the emergency dial pad.

Figure 7:
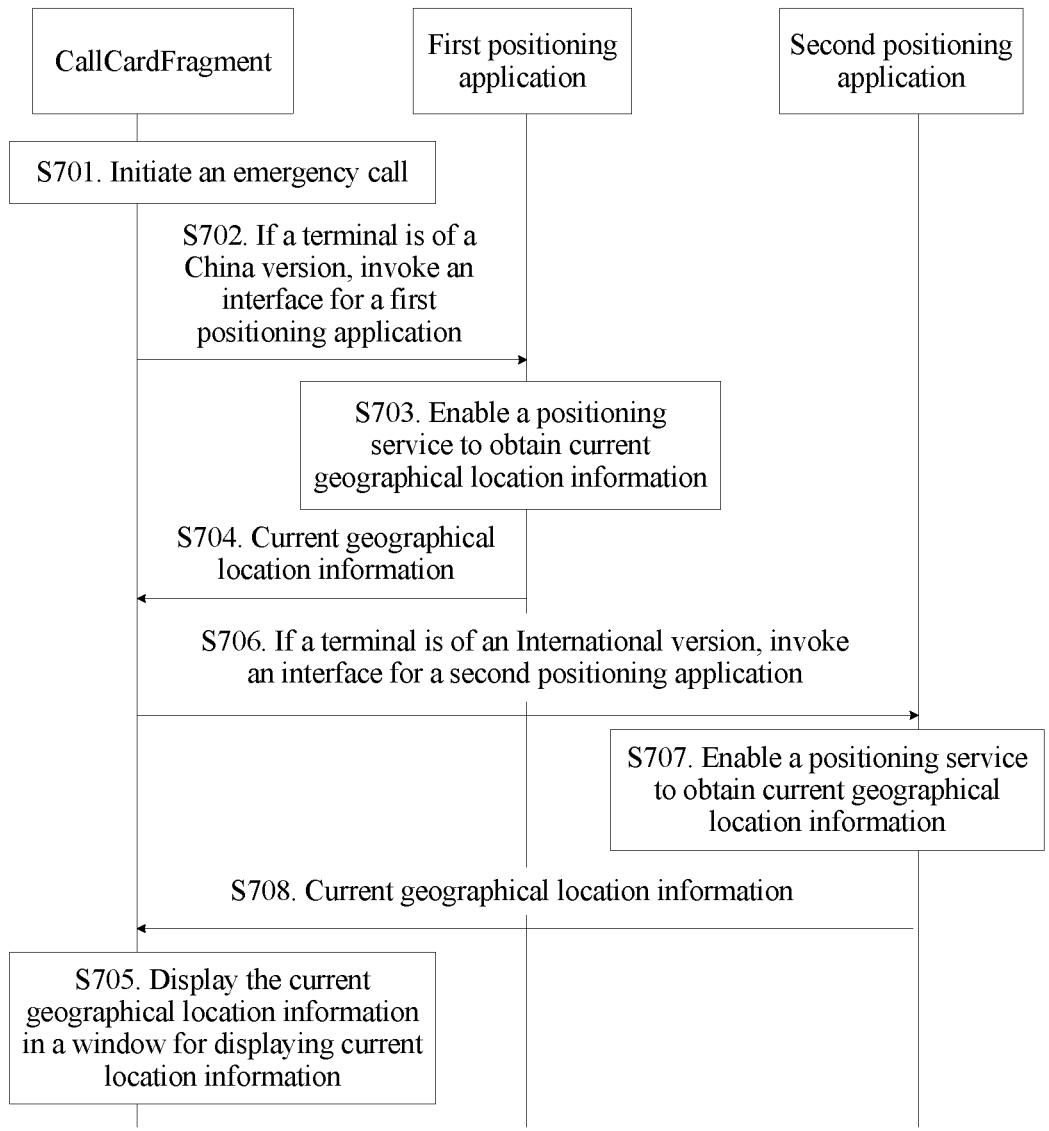
FIG. 7 shows another example according to an embodiment of the present invention.

FIG. 7 shows another example according to an embodiment of the present invention. As shown in FIG. 7, when performing the method, a terminal may create a CallCardFragment (call information displaying) process and a positioning application process. Specifically, the following steps need to be performed to run the method.

S701. CallCardFragment initiates a call, determines that the call is an emergency call, and begins to obtain current geographical location information.

Figure 8:
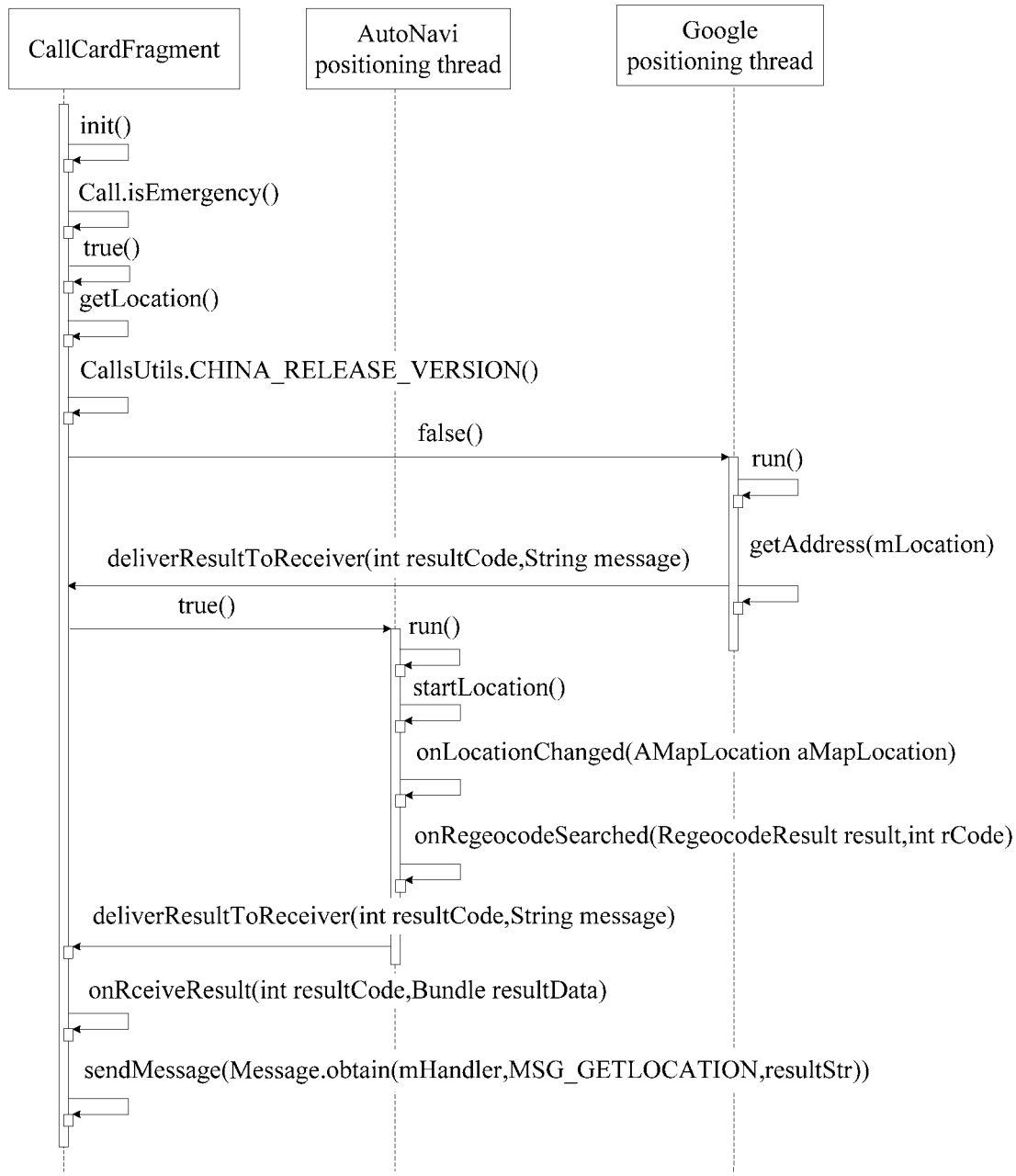
FIG. 8 is a thread time sequence diagram of another example according to an embodiment of the present invention.

For example, FIG. 8 is a thread time sequence diagram of another example according to an embodiment of the present invention. As shown in FIG. 8, the following commands may be executed once to implement S701:

init,
Call.isEmergency,
true,
getLocation,
CallsUtils.CHINA_RELEASE_VERSION.

S702. If the terminal is of a China version, CallCardFragment invokes an interface for a first positioning application, where the first application is used for positioning in a China region, for example, the Amap or the Baidu Map.

S703. The first positioning application starts a thread to enable a positioning service and obtain the current geographical location information.

S704. The first positioning application returns the current geographical location information to CallCardFragment by using a location interface.

S705. CallCardFragment displays the current geographical location information in a window for displaying current geographical location information, where the window for displaying current geographical location information is at a specific location in an emergency dial pad.

In another example, after S701, the method further includes the following steps.

S706. If the terminal is of an International version, CallCardFragment invokes an interface for a second positioning application, where the second application is used for international positioning, for example, the Google Maps.

S707. The second positioning application starts a thread to enable a positioning service and obtain the current geographical location information.

In this procedure, for a terminal that implements positioning by accessing the Internet through Wi-Fi, when Wi-Fi is available, the second positioning application starts a thread, to begin to obtain a current geographical location, and returns a positioning result by using a location interface. When no network is available, Wi-Fi status change broadcast is registered, to obtain location information when Wi-Fi is connected.

S708. The second positioning application returns the current geographical location information to EmergencyDialer by using a location interface.

S705. EmergencyDialer displays the current geographical location information in a window for displaying current geographical location information, where the window for displaying current geographical location information is at a specific location in an emergency dial pad.

It should be noted that when positioning is enabled, a network is available. If the terminal is of the China version, the Amap is invoked to start a thread, to begin to obtain the current geographical location, and returns a positioning result by using the location interface. Then, location information obtained through positioning is displayed at a specific location on a call screen. When no network is available, Wi-Fi status change broadcast is registered, to obtain location information when Wi-Fi is connected.

When the user taps geographical location information text, if the terminal is of the China version, the Amap is invoked and the geographical location information text is displayed in the emergency dial pad in an image-and-text form, and the geographical location information text may be tapped to redirect to the map to view details.

It should be noted that when the user taps geographical location information text, if the terminal is of the China version, the Amap is invoked and the geographical location information text is displayed in the emergency dial pad in an image-and-text form, and the geographical location information text may be tapped to redirect to the map to view details.

Figure 9:
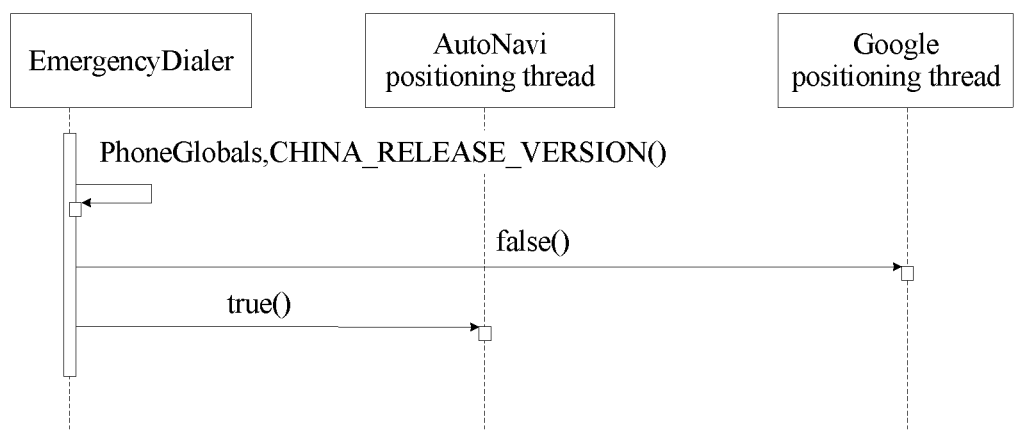
FIG. 9 is a thread time sequence diagram of still another example according to an embodiment of the present invention.

In addition, FIG. 9 is a thread time sequence diagram of still another example according to an embodiment of the present invention. As shown in FIG. 9, EmergencyDialer may enable, by using a PhoneGlobals,CHINA_RELEASE_VERSION command, a user to tap current geographical location information on an emergency call screen to enter a map for viewing.

Figure 10:
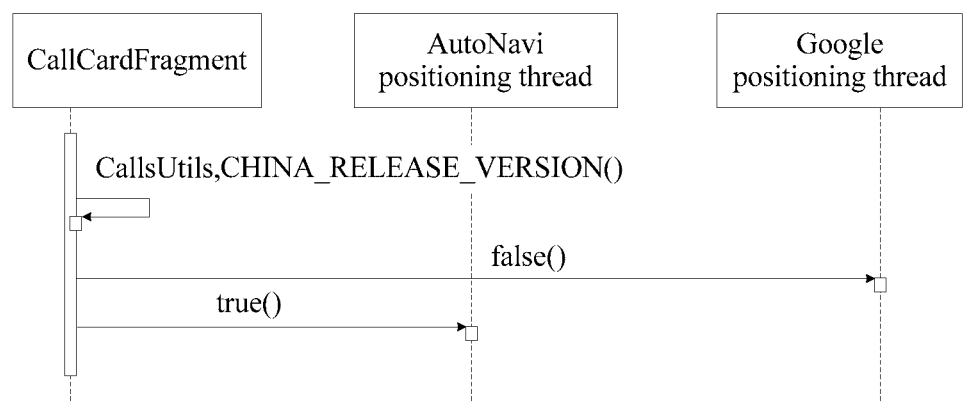
FIG. 10 is a thread time sequence diagram of still another example according to an embodiment of the present invention.

In addition, it should be noted that FIG. 10 is a thread time sequence diagram of still another example according to an embodiment of the present invention. As shown in FIG. 10, CallCardFragment may enable, by using a PhoneGlobals, CHINA_RELEASE_VERSION command, a user to tap current geographical location information on an emergency call screen to enter a map for viewing.

Figure 11:
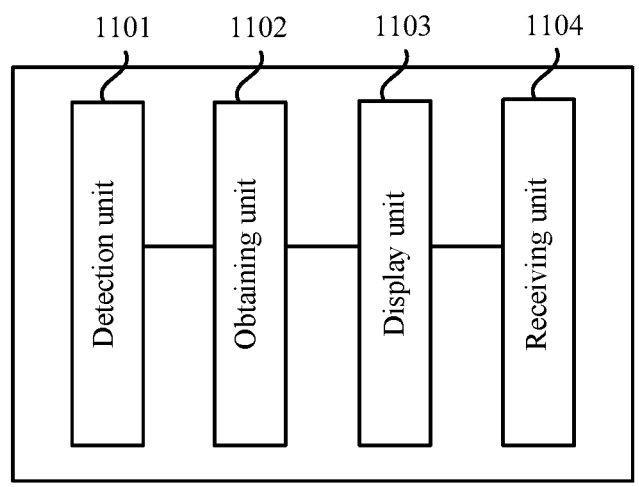
FIG. 11 is a schematic structural diagram of an apparatus configured to display a current geographical location on an emergency call screen according to an embodiment of the present invention.

FIG. 11 is a schematic structural diagram of an apparatus configured to display a current geographical location on an emergency call screen according to an embodiment of the present invention. The apparatus includes a detection unit 1101, an obtaining unit 1102, and a display unit 1103. The detection unit 1101 is configured to detect whether a user initiates an emergency call. The obtaining unit 1102 is configured to: if the user initiates an emergency call, obtain current geographical location information. The display unit 1103 is configured to present the current geographical location information on the emergency call screen, where a presentation form includes at least one of the following: a text form and a map form.

Optionally, the display unit 1103 is further configured to: present a floating window on the emergency call screen, and present the current geographical location information in the floating window.

Optionally, the obtaining unit 1102 is further configured to obtain the current geographical location information in real time.

The display unit 1103 is further configured to update, based on the current geographical location information obtained in real time, the current geographical location information presented on the emergency call screen.

Optionally, the obtaining unit 1102 is further configured to: determine a device version of a terminal; select an obtaining manner of the current geographical location information based on the device version; and obtain the current geographical location information in the obtaining manner of the geographical location information, where the device version includes a China version and an International version.

Optionally, the display unit 1103 is further configured to display a thumbnail view on the emergency call screen, where the thumbnail view includes the current geographical location information.

The apparatus further includes a receiving unit 1104, configured to receive a first user operation, where the first user operation is used to instruct the terminal to display a detailed view, and the detailed view includes the current geographical location information.

The display unit 1103 is further configured to display the detailed view on the emergency call screen.

Optionally, the receiving unit 1104 is further configured to receive a second user operation, where the second user operation includes a destination address.

The apparatus further includes a navigation unit, configured to enable, based on the second user operation, a service to navigate from the current geographical location to the destination address.

Optionally, the receiving unit 1104 is further configured to receive a third user operation, where the third user operation is used to instruct to display the current geographical location information in the map form on the emergency call screen.

The display unit 1103 is further configured to display the current geographical location information in the map form on the emergency call screen.

Optionally, the apparatus further includes a sending unit, configured to send the current geographical location information to a called party of the emergency call.

Optionally, the apparatus further includes a play unit, configured to play voice corresponding to the current geographical location information presented on the emergency call screen.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or some of the steps in the foregoing methods of the embodiments may be implemented by a program instructing a processor. The foregoing program may be stored in a computer readable storage medium. The storage medium may be a non-transitory (English: non-transitory) medium such as a random access memory, read-only memory, a flash memory, a hard disk, a solid state drive, a magnetic tape (English: magnetic tape), a floppy disk (English: floppy disk), an optical disc (English: optical disc), or any combination thereof.

The foregoing descriptions are merely examples of implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method of an emergency call of a terminal, comprising:
    initiating, by the terminal, an emergency call in an emergency call interface, wherein the emergency call interface is a user interface in a locked state;
    displaying a call status of the emergency call in the emergency call interface;
    obtaining, by the terminal, current geographical location information of the terminal;
    sending, by the terminal, a Short Messaging Service (SMS) message or a multimedia message corresponding to the emergency call to a preset emergency contact in the terminal preset by a user according to a change of the call status triggered by the user, wherein the SMS message contains the current geographical location information in a text form or the multimedia message contains the current geographical location information in a map form;
    displaying a thumbnail view, wherein the thumbnail view comprises a current geographical location corresponds to the current geographical location information;
    receiving a first user operation, wherein the first user operation is used to instruct a terminal to display a detailed view, and wherein the detailed view comprises the current geographical location; and
    displaying the detailed view, in combination.

2. The method according to claim 1, wherein the method further comprises:
    presenting a floating window on the emergency call interface; and
    presenting the current geographical location information in the floating window.

3. The method according to claim 1, comprising:
    presenting the current geographical location on a screen of the terminal;
    obtaining the current geographical location information in real time; and
    updating, based on the current geographical location information obtained in real time, the current geographical location presented on the screen.

4. The method according to claim 1, wherein the obtaining current geographical location information comprises:
    determining a device version of a terminal, wherein the device version comprises a China version and an International version; and
    obtaining the current geographical location information using the obtaining a different method based on a different device version.

5. The method according to claim 1, wherein the method further comprises:
    receiving a second user operation, wherein the second user operation comprises a destination address; and
    enabling, based on the second user operation, a service to navigate from the current geographical location to the destination address.

6. The method according to claim 1, wherein the method further comprises:
    presenting the current geographical location information in a text form;
    receiving a third user operation, wherein the third user operation is used to instruct to display the current geographical location information in a map form on the emergency call interface; and
    displaying the current geographical location information in the map form on the emergency call interface.

7. The method according to claim 1, further comprising:
    obtaining a update geographical location information of the terminal after sending the SMS message or the multimedia message containing the current geographical location information corresponding to the emergency call; and
    sending another SMS message or multimedia message to the preset emergency contact, wherein the another SMS message or multimedia message contains the update geographical location information.

8. The method according to claim 1, further comprising:
    playing voice corresponding to the current geographical location information presented on the emergency call interface.

9. A terminal, comprising at least one processor, a memory, and a display, wherein the display is configured to display information, and wherein the memory is configured to store computer instructions, when executed by the at least one processor, cause the terminal to perform operations comprising:
    initiating an emergency call in an emergency call interface, wherein the emergency call interface is a user interface in a locked state;
    displaying a call status of the emergency call in the emergency call interface;
    obtaining current geographical location information of the terminal;
    sending a Short Messaging Service (SMS) message or a multimedia message corresponding to the emergency call to a preset emergency contact in the terminal preset by a user according to a change of the call status triggered by the user, wherein the SMS message contains the current geographical location information in a text form or the multimedia message contains the current geographical location information in a map form;
    displaying a thumbnail view, wherein the thumbnail view comprises a current geographical location corresponds to the current geographical location information;
    receiving a first user operation, wherein the first user operation is used to instruct the terminal to display a detailed view, and wherein the detailed view comprises the current geographical location; and
    displaying the detailed view, in combination.

10. The terminal according to claim 9, wherein the operations further comprise:
    presenting a floating window on the emergency call interface; and
    presenting the current geographical location information in the floating window.

11. The terminal according to claim 9, wherein the operations further comprise:
    presenting the current geographical location on a screen of the terminal;

obtaining the current geographical location information in real time; and updating, based on the current geographical location information obtained in real time, the current geographical location presented on the screen.

12. The terminal according to claim 9, wherein the operations further comprise:

determining a device version of the terminal, wherein the device version comprises a China version and an International version; and obtaining the current geographical location information using a different the obtaining method based on a different device version.

13. The terminal according to claim 9, wherein the operations further comprise:

receiving a second user operation, wherein the second user operation comprises a destination address; and enabling, based on the second user operation, a service to navigate from the current geographical location to the destination address.

14. The terminal according to claim 9, wherein the operations further comprise:

presenting the current geographical location information in the text form;

receiving a third user operation, wherein the third user operation is used to instruct to display the current geographical location information in the map form; and displaying the current geographical location information in the map form.

15. The terminal according to claim 9, wherein the operations further comprise:

obtaining a update geographical location information of the terminal after sending the SMS message or the multimedia message containing the current geographical location information corresponding to the emergency call; and sending another SMS message or multimedia message to the preset emergency contact, wherein the another SMS message or multimedia message contains the update geographical location information.

16. The terminal according to claim 9, wherein the operations further comprise:

playing voice corresponding to the current geographical location information presented on an emergency call interface.

* * * * *